United States Patent
Takashima et al.

(10) Patent No.: US 7,609,148 B2
(45) Date of Patent: Oct. 27, 2009

(54) ACTUATOR, TOUCH PANEL DISPLAY DEVICE, ELECTRONIC APPARATUS

(75) Inventors: Kouichiro Takashima, Tokyo (JP); Shun Kayama, Saitama (JP); Minoru Nakano, Kanagawa (JP); Yukiko Shimizu, Saitama (JP)

(73) Assignee: Sony Corporation, Tokyo (JP)

( * ) Notice: Subject to any disclaimer, the term of this patent is extended or adjusted under 35 U.S.C. 154(b) by 385 days.

(21) Appl. No.: 11/538,679

(22) Filed: Oct. 4, 2006

(65) Prior Publication Data
US 2007/0102270 A1 May 10, 2007

(30) Foreign Application Priority Data
Oct. 6, 2005 (JP) ............................ P2005-293204
Feb. 9, 2006 (JP) ............................ P2006-032749

(51) Int. Cl.
*G08B 3/00* (2006.01)
(52) U.S. Cl. ............... 340/388.1; 340/384.1; 340/388.6; 340/390.2; 340/407.1; 381/396; 381/398
(58) Field of Classification Search .............. 340/388.1, 340/388.2, 388.3, 391.1, 384.1, 388.6, 390.2, 340/407.1; 381/396, 398
See application file for complete search history.

(56) References Cited

U.S. PATENT DOCUMENTS

| | | | | |
|---|---|---|---|---|
| 6,724,908 | B2 * | 4/2004 | Fukuyama | ................. 381/396 |
| 6,753,630 | B1 | 6/2004 | Ueda et al. | |
| 6,810,128 | B2 * | 10/2004 | Kaneda et al. | .............. 381/396 |
| 6,873,234 | B2 * | 3/2005 | Kyouno et al. | .............. 335/278 |
| 6,982,630 | B2 * | 1/2006 | Beckwith et al. | ......... 340/407.1 |
| 2003/0122797 | A1 | 7/2003 | Bang et al. | |

FOREIGN PATENT DOCUMENTS

| | | |
|---|---|---|
| JP | 2570923 | 2/1998 |
| JP | 11-069488 | 3/1999 |
| JP | 2003-309896 | 10/2003 |
| JP | 2003288168 | 10/2003 |
| JP | 2004-007761 | 1/2004 |
| JP | 2004-021697 | 1/2004 |
| JP | 2004-110388 | 4/2004 |
| WO | 00-62945 | 10/2000 |

OTHER PUBLICATIONS

Japanese Office Action (JP 2006-032749) issued on Dec. 18, 2008.

* cited by examiner

*Primary Examiner*—Davetta W Goins
(74) *Attorney, Agent, or Firm*—K&L Gates LLP

(57) ABSTRACT

An actuator is provided that includes: a diaphragm that vibrates to generate sound; a housing that is attached to an outer edge of the diaphragm to support the diaphragm; an accommodating space that is formed inside the diaphragm and the housing, and an axis of which extends in a thickness direction of the diaphragm in the middle of the diaphragm; a coil that is wound around the axis, is attached to a face of the diaphragm facing the accommodating space, and is disposed in the accommodating space; a movable body that is disposed in a radial inside space of the coil or on an extension of the space, within the accommodating space; and a spring that supports the movable body such that the movable body is movable in the axial direction within the accommodating space.

14 Claims, 39 Drawing Sheets

ACTUATOR, TOUCH PANEL DISPLAY DEVICE, ELECTRONIC APPARATUS

CROSS REFERENCES TO RELATED APPLICATIONS

The present application claims priority to Japanese Patent Application JP 2005-293204 filed in the Japanese Patent Office on Oct. 6, 2005; and JP 2006-032749 filed in the Japanese Patent Office on Feb. 9, 2006, respectively, the entire contents of which being incorporated herein by reference.

BACKGROUND

The present disclosure relates to an actuator, a touch panel display device, and an electronic apparatus.

Among portable electronic apparatuses, there is an electronic apparatuses provided with a speaker that generates sound (operation sound), such as beep sound, or a vibration generator that vibrates a case of the electronic apparatus.

In the related art, since the speaker and the vibration generator are provided separately, they occupy space within the case of the electronic apparatus, which is disadvantageous to miniaturization.

Therefore, Japanese Utility Model No. 2570923 suggests an actuator that has both a function as the speaker and a function as the diaphragm.

This actuator includes a diaphragm, a housing to which the diaphragm is attached, a coil attached to the diaphragm, a magnet disposed inside the coil, a spring that movably supports the magnet, and a plurality of members (yoke members) that constitute a magnetic circuit that leads lines of magnetic force from the magnet to the coil, and a case that is made of synthetic resin to accommodate the coil, the magnet, the spring, and the yoke. Here, the actuator is configured such that, when an electrical signal is supplied to the coil, the coil and the magnet are caused to relatively move, thereby vibrating the diaphragm to generate sound, and the vibration of the magnet vibrate the housing.

Meanwhile, in a touch panel display device to be used as an input device or an output device, its input screen can be configured freely by software. Therefore, the touch panel display device has flexibility that cannot be obtained from an input device that is configured using mechanical switches, and has many advantages that it can be made lightweight and compact, and the frequency of occurrence of mechanical failures is low. Thus, the touch panel display device is currently used in a wide range of operation panels of a variety of relatively large machines to input/output devices of very small portable apparatuses.

Since many touch panel display devices are operated simply by touching a flat and smooth panel surface with a finger of a user who operates the touch panel display devices, there does not exist feedback to the user caused from a sense of touch of a user's finger tip, such as click feeling that the user feels with his/her finger tip when an input device that is configured using mechanical switches is operated. This makes operational feeling unreliable. In order to improve this, JP-A-2003-288168 discloses a touch panel display device that is adapted to feed a sense of touch back to a finger tip of a user who operates the device.

The touch panel display device disclosed in this publication is adapted to vibrate a touch panel to be touched by a user's finger tip in a direction vertical to a panel surface of the touch panel, thereby generating a sense of touch in the user's finger tip.

Accordingly, if the above actuator is applied to the above touch panel display device, a sense of touch can be generated in an operating user's finger tip, and a sound, such as an operation sound, can also be generated.

Meanwhile, in the above-described known actuator, vibration of the magnet causes vibration of the housing. Therefore, as the weight of the magnet increases, greater vibration is generated.

However, if the actuator is intended to be miniaturized, the volume of the magnet is also miniaturized and thereby the magnet becomes lightweight. Therefore, it is disadvantageous to ensure the magnitude of vibration.

Moreover, in the above-described known actuator, the coil, the magnet, the spring, and the plurality of yoke members are incorporated into the case made of synthetic resin. Therefore, the number of parts increases and the assembling is complicated, which is disadvantageous to realize miniaturization and cost reduction.

Accordingly, it is desirable to provide an actuator, a touch panel display device, and an electronic apparatus that are advantageous to ensure the magnitude of vibration to be generated while realizing miniaturization.

It is also desirable to provide an actuator that is advantageous to realize miniaturization and cost reduction.

It is also desirable to provide a touch panel display device and an electronic apparatus that can generate a sense of touch in an operating user's finger tip and generate sound, and that are advantageous to realize cost reduction and miniaturization.

SUMMARY

According to an embodiment, there is provided an actuator including: a diaphragm that vibrates to generate sound; a housing that is attached to an outer edge of the diaphragm to support the diaphragm; an accommodating space that is formed inside the diaphragm and the housing, and an axis of which extends in a thickness direction of the diaphragm in the middle of the diaphragm; a coil that is wound around the axis, is attached to a face of the diaphragm facing the accommodating space, and is disposed in the accommodating space; a movable body that is disposed in a radial inside space of the coil or on an extension of the space, within the accommodating space; and a spring that supports the movable body such that the movable body is movable in the axial direction within the accommodating space. Here, when an electrical signal is supplied to the coil, the coil and the movable body are caused to relatively move in the axial direction, thereby vibrating the diaphragm to generate sound, and the vibration of the movable body vibrate the housing. The movable body is provided with a weight increasing member that increases the weight of the movable body.

According to another embodiment, there is provided a touch panel display device including: a panel unit having a display panel and a touch panel disposed on the display panel, a driving circuit that sends out an electrical signal when the touch panel is touched by a finger, and an actuator that vibrates the panel unit on the basis of the electrical signal of the driving circuit. The actuator includes: a diaphragm that vibrates to generate sound; a housing that is attached to an outer edge of the diaphragm to support the diaphragm; an accommodating space that is formed inside the diaphragm and the housing, and an axis of which extends in a thickness direction of the diaphragm in the middle of the diaphragm; a coil that is wound around the axis, is attached to a face of the diaphragm facing the accommodating space, and is disposed in the accommodating space; a movable body that is disposed in a radial inside space of the coil or on an extension of the space, within the accommodating space; and a spring that supports the movable body such that the movable body is movable in the axial direction within the accommodating space. Here, when an electrical signal is supplied to the coil, the coil and the movable body are caused to relatively move in the axial direction, thereby vibrating the diaphragm to generate sound, and the vibration of the movable body vibrate the housing. The movable body is provided with a weight increasing member that increases the weight of the movable body.

According to another embodiment, there is provided an electronic apparatus including: a panel unit having a display panel and a touch panel disposed on the display panel, a driving circuit that sends out an electrical signal when the touch panel is touched by a finger, and an actuator that vibrates the panel unit on the basis of the electrical signal of the driving circuit. The actuator includes: a diaphragm that vibrates to generate sound; a housing that is attached to an outer edge of the diaphragm to support the diaphragm; an accommodating space that is formed inside the diaphragm and the housing, and an axis of which extends in a thickness direction of the diaphragm in the middle of the diaphragm; a coil that is wound around the axis, is attached to a face of the diaphragm facing the accommodating space, and is disposed in the accommodating space; a movable body that is disposed in a radial inside space of the coil or on an extension of the space, within the accommodating space; and a spring that supports the movable body such that the movable body is movable in the axial direction within the accommodating space. Here, when an electrical signal is supplied to the coil, the coil and the movable body are caused to relatively move in the axial direction, thereby vibrating the diaphragm to generate sound, and the vibration of the movable body vibrate the housing. The movable body is provided with a weight increasing member that increases the weight of the movable body.

According to the embodiments, a magnetic interaction of a magnetic field generated by the coil and a magnetic field generated by the magnet causes both the coil and the movable body to relatively vibrate in the axial direction. The vibration of the coil in the axial direction causes the diaphragm to vibrate in the thickness direction thereof, thereby generating sound. At the same time, the vibration of the movable body in the axial direction is transmitted to the housing, whereby the housing vibrates.

Accordingly, the vibration generated by the movable body can be further increased by increasing the weight of the movable body using the weight increasing part, which is advantageous to miniaturize the actuator and ensure the magnitude of vibration to be generated.

Moreover, if the housing and the spring of the actuator are formed integrally, and the magnet, the spring, and the housing constitute the magnetic circuit that leads lines of magnetic force from the magnet to the coil, as compared with the related art, a plurality of yoke members become unnecessary. As a result, it is advantageous to reduce the number of parts, thereby simplifying assembling, and realizing cost reduction and miniaturization.

Additional features and advantages are described herein, and will be apparent from, the following Detailed Description and the figures.

DETAILED DESCRIPTION

First Embodiment

Figure 1:
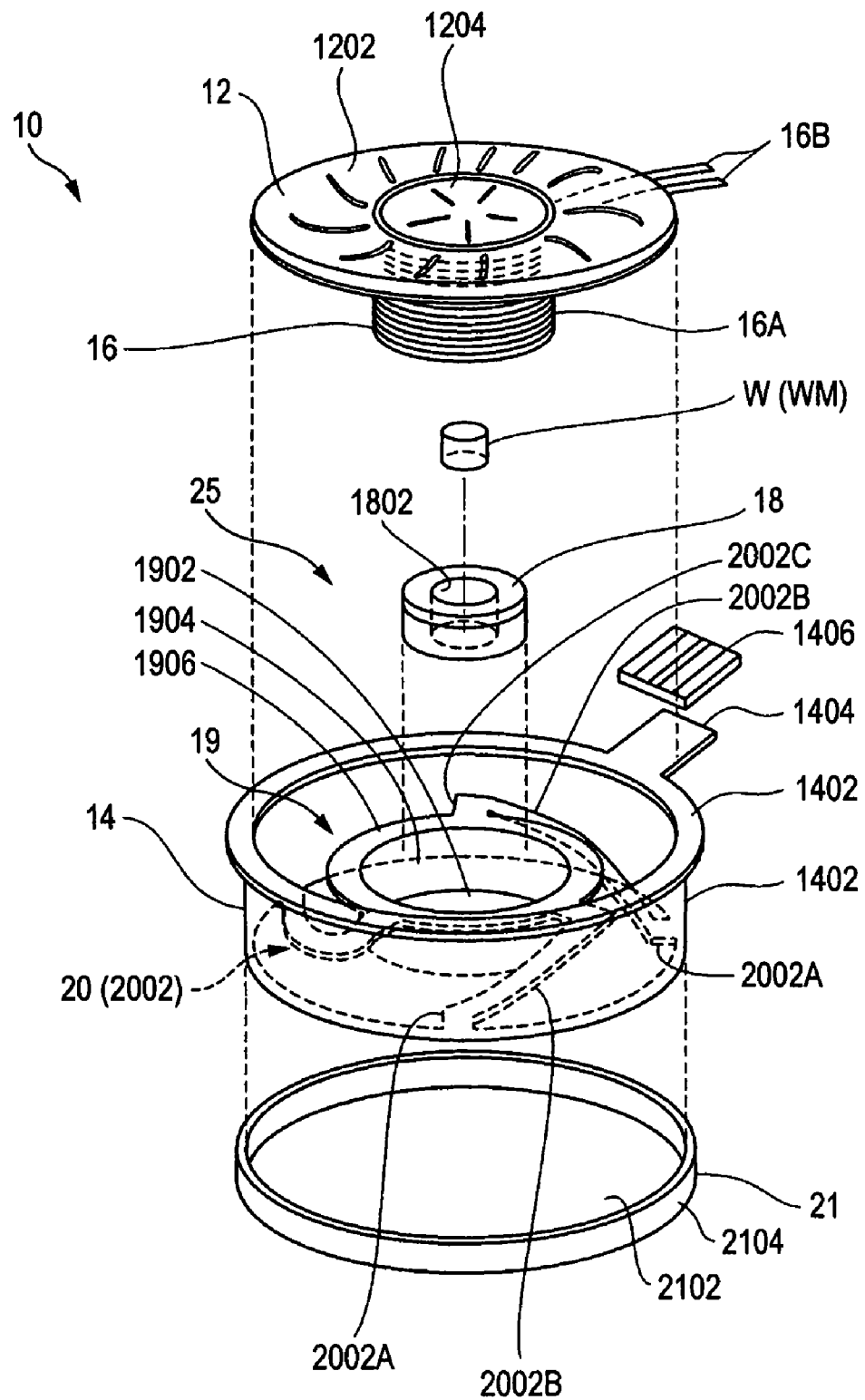
FIG. 1 is an exploded perspective view of an actuator 10 according to a first embodiment.
Figure 2:
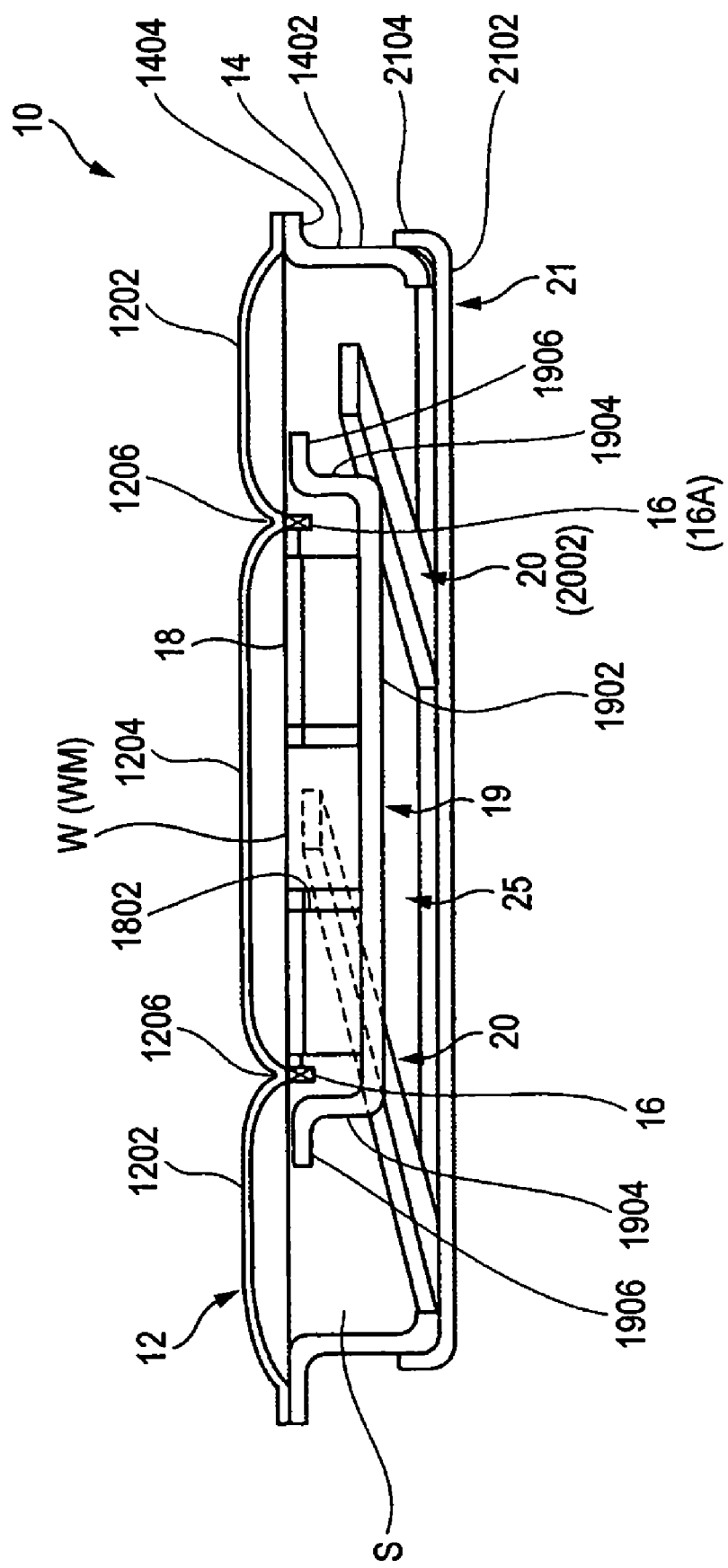
FIG. 2 is a sectional view of the actuator 10.

FIG. 1 is an exploded perspective view of an actuator 10, and FIG. 2 is a sectional view of the actuator 10.

As shown in FIGS. 1 and 2, the actuator 10 includes a diaphragm (cone) 12, a housing 14, a coil 16, a magnet 18, a yoke 19, a spring 20, a cover 21, and a weight increasing part W.

The diaphragm 12 has an annular plate part 1202 that is formed to have an upwardly convex section, a circular middle plate part 1204 that is disposed in the middle of the annular plate part 1202, and an annular recessed part 1206 that connects an inner periphery of the annular plate part 1202 with an outer periphery of the middle plate part 1204.

In the present embodiment, the diaphragm 12 is made of synthetic resin, such as PC (polycarbonate) or PET (polyethylene terephthalate), and has a thickness of, for example, about 0.025 mm to 0.05 mm, and is configured to vibrate in a thickness direction thereof to generate sound.

The housing 14 is formed in the shape of a tube with almost the same dimension as the outer diameter of the diaphragm 12, and is attached to an outer edge of the annular plate part 1202 of the diaphragm 12 to support the diaphragm 12.

Also, an accommodating space S, the axis of which extends in the thickness direction in the middle of the diaphragm 12, is formed inside the diaphragm 12 and the housing 14.

The housing 14 has a cylindrical wall part 1402, and a flange part 1404 that extends radially outwardly from one axial end of the cylindrical wall part 1402. The flange part 1404 is fixed to the outer edge of the annular plate part 1202 with adhesive.

Moreover, a protruding piece 1406 is provided so as to protrude radially outwardly from a portion of the flange part 1404.

The coil 16 includes a coil part 16A and lead parts 16B.

The coil part 16A is wound around the axis, and attached to one face of the annular recessed part 1206 of the diaphragm 12 within the accommodating space S. Accordingly, the axis of the coil part 16A coincides with the axis of the housing 14.

That is, the coil part 16A is formed with almost the same diameter as the annular recessed part 1206.

The lead parts 16B are formed such that winding that constitutes the coil part 16A extends radially outwardly of the coil part 16A from both ends of the coil part 16A. The lead parts 16B are led to the outside of the housing 14 by way of a terminal board 23 attached to the protruding piece 1406.

In the present embodiment, the winding that constitutes the coil part 16A is, for example, a copper wire having a diameter of 40 μm. A holding member 22 is formed of synthetic resin, such as PC (polycarbonate), acrylic, or ABS (acrylonitrile butadiene styrene).

The magnet 18 is formed in the shape of an annular plate, and one end of the magnet in a thickness direction thereof is magnetized to either an N pole or an S pole, and the other end of the magnet is magnetized to the other N pole or S pole.

In the present embodiment, the magnet 18 is formed of, for example, a neodymium-based sintered magnet.

An accommodating hole 1802 is formed in the middle of the magnet 18. In the present embodiment, the accommodating hole 1802 passes through the magnet in the thickness direction thereof.

In the present embodiment, the weight increasing part W is composed of a weight increasing member WM that is formed of a material having a greater specific gravity than the magnet 18. As such a material, for example, tungsten and brass can be employed.

The weight increasing member WM is formed in a cylindrical shape having such a diameter that it can be accommodated in the accommodating hole 1802. In the present embodiment, the thickness of the weight increasing member WM and the thickness of the magnet 18 are formed to be almost the same dimension.

The yoke 19 has a bottom wall 1902 that is formed to have a greater diameter than the outer diameter of the magnet 18, a tubular side wall 1904 that is erected from an outer edge of the bottom wall 1902, and a flange part 1906 that is bent radially outwardly from a tip of the side wall 1904.

The yoke 19 is supported by the spring 20 such that the center of the bottom wall 1902 coincides with the axis of the housing 14.

The spring 20 is composed of a plurality of arm parts 2002 that extend to an inner periphery of the housing 14 from a plurality of spots at regular intervals in a peripheral direction of the other axial end of the cylindrical wall part 1402 of the housing 14.

Each of the arm parts 2002, as shown in FIG. 1, includes a first rectilinear section 2002A that extends radially inwardly from the housing 14, a curvilinear section 2002B that extends towards the diaphragm 12 along an inner peripheral face of the housing 14 from a tip of the first rectilinear section 2002A, and a second rectilinear section 2002C that extends radially inwardly of the housing 14 from a tip of the curvilinear section 2002B and is connected to the flange part 1906.

The magnet 18 is placed in the middle of the bottom wall 1902 and is fixedly bonded with adhesive in a state where it is positioned such that the axis of the magnet 18 coincides with the axis of the coil 16 (the axis of the housing 14), and the magnet 18 is positioned inside the tubular side wall 1902.

Moreover, as shown in FIG. 2, an end of the coil 16 away from the diaphragm 12 is located outside the magnet 18 and inside the tubular side wall 1904. That is, a portion of the coil part 16A of the coil 16 is located in an annular space that is formed between an outer periphery of the magnet 18 and an inner periphery of the side wall 1904 of the yoke 19. Accordingly, the bottom wall 1902 and side wall 1904 of the yoke 19 constitute a magnetic circuit that leads lines of magnetic force from the magnet 18 to the coil 16, thereby improving a magnetic mutual action that occurs between the magnet 18 and the coil 16.

The weight increasing member WM is accommodated in the through hole 1802, and is placed in the middle of the bottom wall 1902 and is fixedly bonded with adhesive in a state where it is positioned such that the axis of the weight increasing member WM coincides with the axis of the coil 16.

In the present embodiment, the magnet 18, the weight increasing member WM, and the yoke 19 constitute a movable body 25 as set forth in the claims, and the movable body 25 is supported so as to be movable in the axial direction within the accommodating space S by the spring 20.

The cover 21 has a bottom wall 2102 that is formed to have almost the same diameter as the outer diameter of the housing 14, and a side wall 2104 that is erected from an outer edge of the bottom wall 2102, and the cover is fitted into the other axial end of the housing 14 so as to close the whole surface of the housing 14 opposite to the diaphragm 12.

The cover 21 is formed of a magnetic material, such as stainless steel, and shields lines of magnetic force that are directed towards the outside of the housing 14 through a space between the arm parts 2002 from the coil 16.

In the present embodiment, the housing 14, the yoke 19, and the spring 20 are formed of a magnetic material that efficiently leads lines of magnetic force from the magnet 18, and they are integrally formed by performing pressing, such as bending, drawing, or punching, on a stainless plate having a thickness of about 0.2 mm to 1.0 mm, thereby achieving cost reduction and reliability improvement by virtue of a reduction in the number of parts.

In addition, the housing 14, the yoke 19, and the spring 20 may be formed separately, and at least the yoke 19 is desirably formed of a magnetic material that efficiently leads lines of magnetic force from the magnet 18.

In addition, although the present embodiment has been described for the case where three arm parts 2002 are provided, the arm parts 2002 may be two or more or four or more. However, in a case where three arm parts 2002 are provided as in the present embodiment, it is advantageous to ensure the length of the curvilinear section 2002B and stably support the movable body 25.

Next, the operational effects of the actuator 10 will be described.

When a predetermined electrical signal (current signal) is supplied to the lead parts 16B of the coil 16 from an external device, a magnetic field is generated from the coil 16. The magnetic interaction of the magnetic field generated by the coil 16 and the magnetic field generated by the magnet 18 causes both the coil 16 and the movable body 25 to relatively vibrate in the axial direction.

The vibration of the coil 16 in the axial direction causes the diaphragm 12 to vibrate in the thickness direction thereof, thereby generating sound.

At the same time, the vibration of the movable body 25 in the axial direction is transmitted to the housing 14, whereby the housing 14 vibrates.

The vibrational frequencies of the diaphragm 12 and the magnet 18 are determined by the frequency of an electrical signal to be supplied to the coil 16.

Accordingly, according to the present embodiment, since the vibration generated by the movable body 25 can be further increased by increasing the weight of the movable body 25 using the weight increasing part W that is provided in the movable body 25, it is advantageous to miniaturize the actuator 10 and ensure the magnitude of vibration to be generated.

Figure 3A:
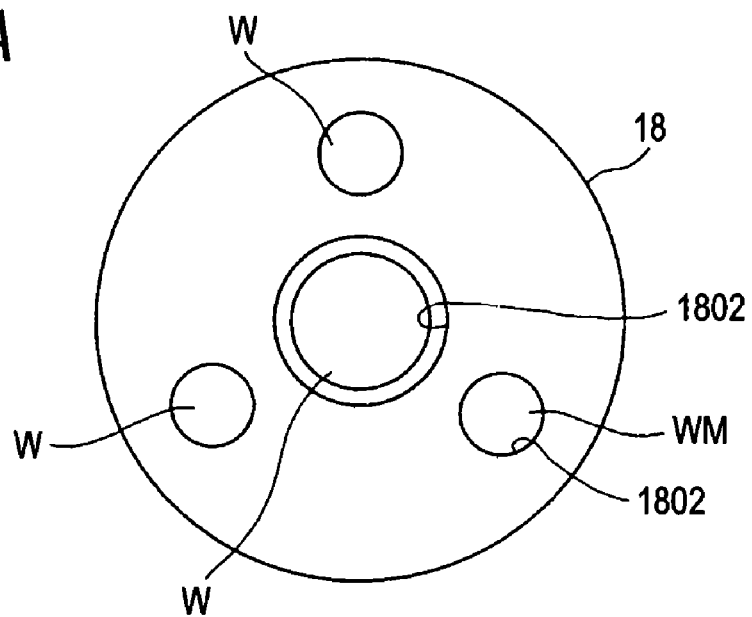
FIGS. 3A to 3C are explanatory views showing a modified example of a weight increasing member WM.
Figure 3B:
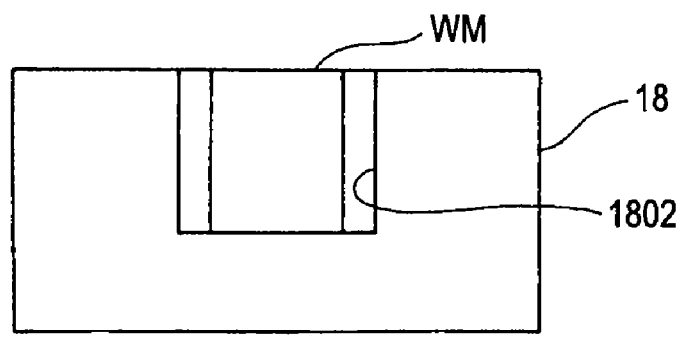
Figure 3C:
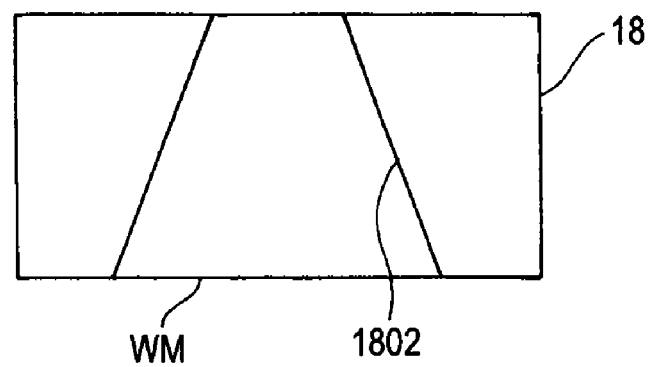

FIGS. 3A to 3C are explanatory views showing a modified example of the weight increasing member WM.

As shown FIG. 3A, weight increasing members WM may be accommodated in a plurality of accommodating holes 1802, respectively, by providing the plurality of accommodating holes 1802 at regular intervals in a peripheral direction of the magnet 18 in addition to providing one accommodating hole 1802 in the center of the magnet 18.

In this case, as compared with the first embodiment, it is advantageous to increase the weight of the movable body 25.

Moreover, as shown in FIG. 3B, the accommodating hole 1802 may not pass through the magnet 18 in the thickness direction thereof.

In this case, the weight increasing member WM is attached to the bottom of the accommodating hole 1802.

In the present embodiment, as compared with the first embodiment, it is advantageous to ensure the volume of the magnet 18 and lines of magnetic force, whereas it is disadvantageous to increase the weight of the weight increasing member WM.

Moreover, as shown in FIG. 3C, the accommodating hole 1802 is formed in the shape of a tapered face such that, as the accommodating hole reaches a lower part, the sectional area thereof increases, and the weight increasing member WM is formed in the shape of a tapered face to fit on the above tapered face.

In this case, since an inner peripheral face of the accommodating hole 1802 of the magnet 18 and an outer peripheral face of the weight increasing member WM are fitted on each other, it is advantageous to ensure the strength of attachment of the weight increasing member WM to the magnet 18 and the yoke 19.

Next, a case where the actuator 10 according to an embodiment is applied to a touch panel display device provided in an electronic apparatus is described.

Figure 4:
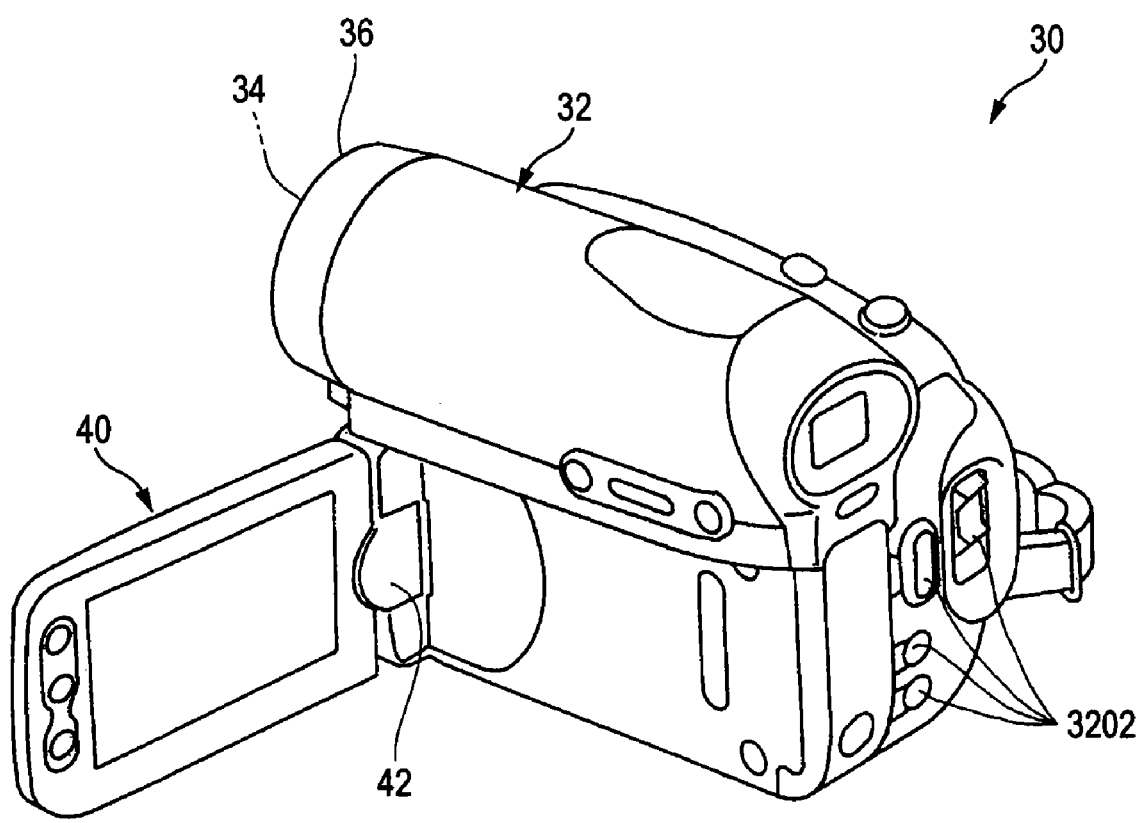
FIG. 4 is a perspective view of an electronic apparatus according to the first embodiment.

FIG. 4 is a perspective view of an electronic apparatus according to the present embodiment.

In the present embodiment, the electronic apparatus is a video camera 30.

The video camera 30 has a case 32 that constitutes an outer package. A front upper part of the case 32 is provided with a lens barrel 36 into which an image pickup optical system 34 is incorporated. An image pickup device (not shown) that picks up an object image that has been led by the image pickup optical system 34 is incorporated into a rear end of the lens barrel 36.

Various operation switches 3202, such as a power switch, an image pickup start/stop switch and a zoom switch, are provided on a rear face, a top face, and a side face of the case 32.

On the left side face of the case 32, a touch panel display device 40 for displaying an image that is picked up by the image pickup device is connected to the case 32 so as to be openable/closable about a hinge 42, and the invention is applied to the touch panel display device 40.

Figure 5:
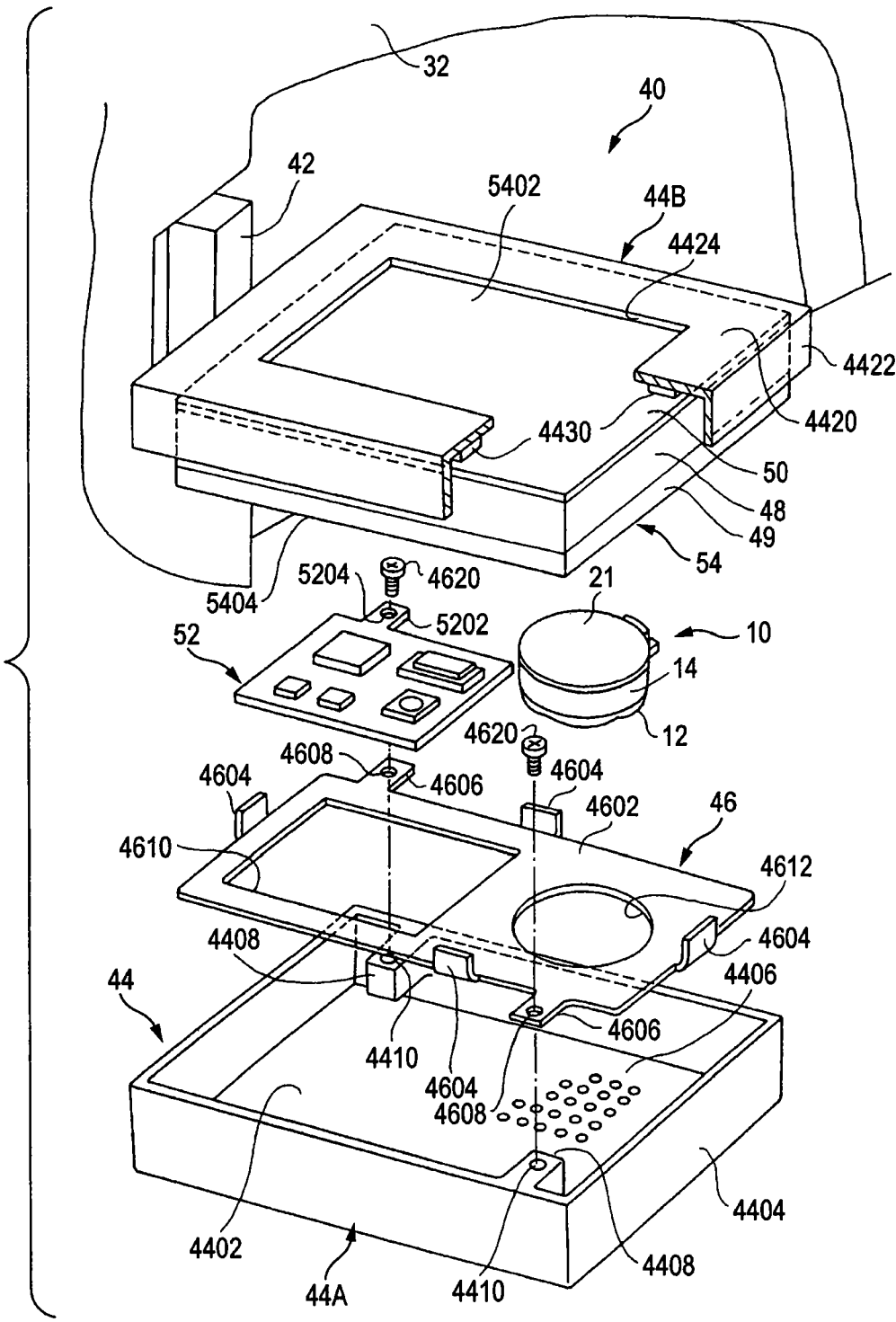
FIG. 5 is an exploded perspective view of a touch panel display device 40 using the actuator 10 according to the first embodiment
Figure 6:
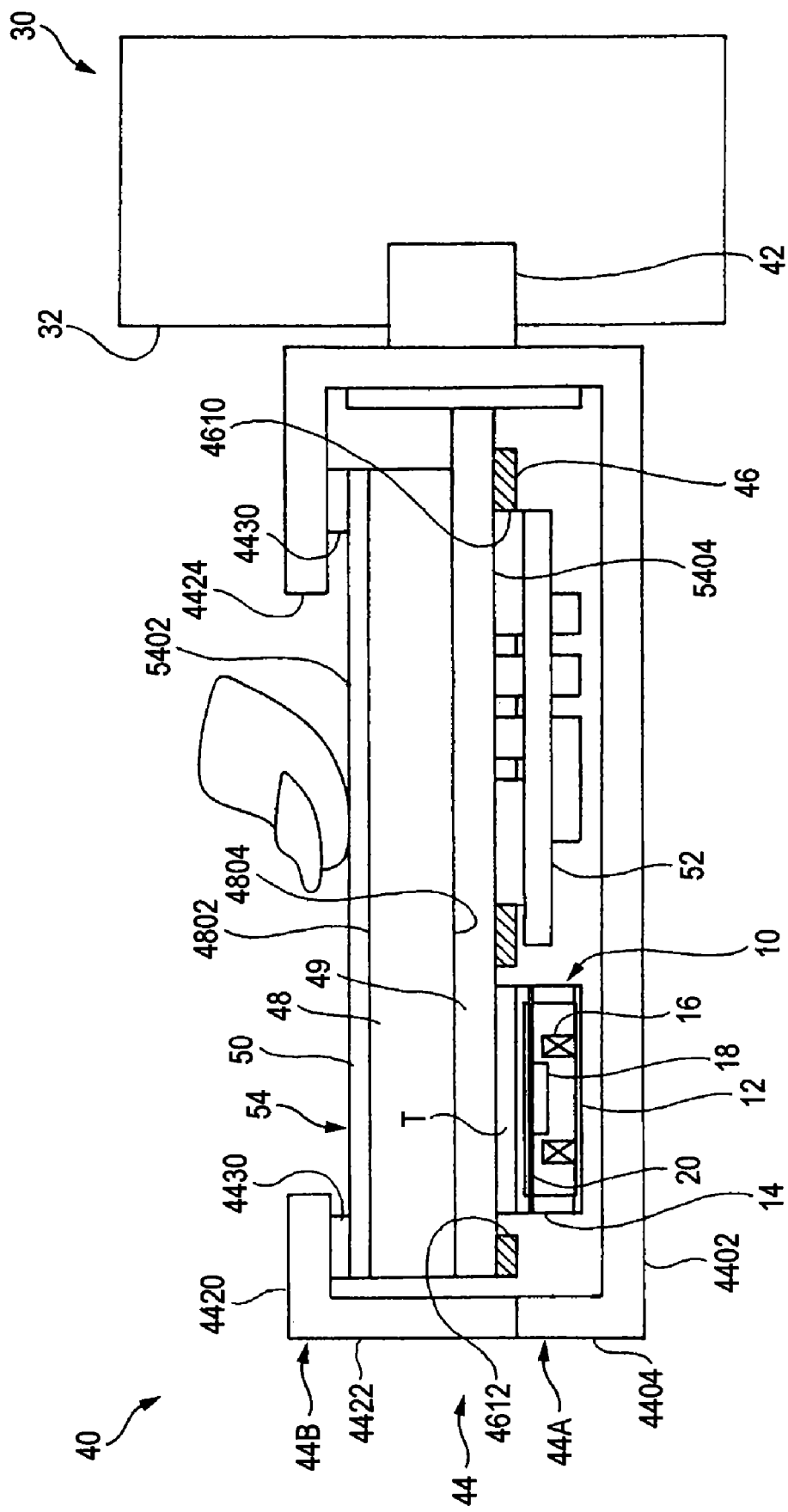
FIG. 6 is a sectional view of the touch panel display device 40.

FIG. 5 is an exploded perspective view of the touch panel display device 40 using the actuator 10 according to the first embodiment, and FIG. 6 is a sectional view of the touch panel display device 40.

The touch panel display device 40 has a case 44 (equivalent to a chassis in the claims), a frame 46, a display panel 48, a back light unit 49, a touch panel 50, a circuit board 52, the actuator 10, etc.

The case 44 has a first case 44A that is formed in the shape of a rectangular plate, and a second case 44B that is formed in the shape of a rectangular frame, and combined with the first case 44A. By combining the first case 44A and the second case 44B, the frame 46, the display panel 48, the touch panel 50, the circuit board 52, and the actuator 10 are accommodated and held within the case 44.

The first case 44A has an oblong outer wall 4402, and four side walls 4404 that are erected from four sides of the outer wall 4402.

A plurality of sound releasing holes 4406 are formed in a spot in the vicinity of one short side of the outer wall 4402 so as to pass therethrough.

Mounting parts 4408 are respectively provided inside two long side walls 4404 so as to protrude therefrom, and a screw hole 4410 is formed in a face of each mounting part 4408 opposite to the outer wall 4402.

The second case 44B has an inner wall 4420 (equivalent to a frame-like front face of a chassis in the claims) that is formed in the shape of an oblong frame having an outline that is one size larger than the outer wall 4402 of the first case 44A, and four side walls 4422 that are erected from four sides of the inner wall 4420. An oblong opening 4424 is formed in the inner wall 4420.

A cushioning member 4430 that has a constant thickness along the opening 4424 and made of an elastic material, such as sponge or rubber, is bonded to an inner face of the inner wall 4420.

One of the short side walls 4422 is connected to the hinge 42.

An engaging claw and an engaging groove (not shown) are formed in the mutually facing side walls 4422 and 4404, respectively, in a state where the four side walls 4404 of the first case 44A are accommodated inside the four side walls 4422 of the second case 44B. When the engaging claw and the engaging groove are engaged with each other, the first case 44A and the second case 44B are connected to each other.

The frame 46 is made of sheet metal, and has an oblong plate-shaped main plate part 4602 that is formed to have such a size that it can be accommodated inside the four side walls 4404 of the first case 44A.

A locking piece 4604 is erected from a substantially middle spot of each of four edges of the main plate part 4602.

Mounting pieces 4606 are respectively provided in the spots corresponding to the mounting parts 4408 of the first case 44A in two long sides of the main plate part 4602 so as to protrude therefrom. An insertion through-hole 4608 corresponding to the screw hole 4410 is formed in each mounting piece 4606.

Moreover, a rectangular circuit board accommodating opening 4610 is formed in the main plate part 4602 to accommodate the circuit board 52. Moreover, a circular actuator accommodating opening 4612 is formed in the main plate part in parallel with the circuit board accommodating opening 4610 to accommodate the actuator 10.

The circuit board 52 takes a rectangular plate shape that is one size smaller than the circuit board accommodating opening 4610, and has electronic components mounted on both faces thereof.

A mounting piece 5202 is formed on one side of the circuit board 52 so as to protrude therefrom, and a screw insertion through-hole 5204 is formed in the mounting hole 5202.

The display panel 48 is composed of, for example, a liquid crystal display panel, and is formed in the shape of an oblong plate having such a size that it can be accommodated inside the second case 44B.

In the display panel 48, one surface thereof is formed as a display surface 4802, and the other surface 4804 thereof is integrally combined with the back light unit 49 that illuminates the display panel 48 from the other surface 4804.

The touch panel 50 is formed in the shape of a sheet, and bonded to the display surface 4802 in a state where it covers the whole display surface 4802, whereby the touch panel 50 and the display panel 48 are combined integrally. That is, the touch panel 50, the display panel 48, and the back light unit 49 constitute a panel unit 54.

Accordingly, the surface of the panel unit 54 forms a panel surface 5402 that is brought into contact with a finger tip of a user who tries to operate the touch panel display device 40.

The touch panel display device 40 is assembled as follows.

First, the frame 46 is placed on the first case 44A, and the circuit board 52 is located in the circuit board accommodating opening 4610 of the frame 46.

In that state, the screw 4620 is inserted through the screw insertion through-hole 5204 of the circuit board 52 and the screw insertion through-hole 4608 of the frame and is screwed into the screw hole 4410, and the other screw 4620 is inserted through the screw insertion through-hole 4608 of the frame and is screwed into the screw hole 4410.

This allows the frame 46 and the circuit board 52 to be assembled to the first case 44A.

Next, the cover 21 of the actuator 10 is bonded and attached to a predetermined spot of a rear surface 5404 (a surface of the panel unit opposite to the panel surface) of the panel unit 54 with a double-sided adhesive tape T.

Next, the rear surface of the panel unit 54 to which the actuator 10 is attached is placed on the main plate part 4602 of the frame 46, the actuator 10 is caused to be accommodated in the actuator accommodating opening 4612, and the four locking pieces 4604 of the frame 46 are abutted against the four side faces of the panel unit 54.

In that state, the second case 44B is inserted into the first case 44A, thereby combining the second case 44B with the first case 44A.

In this state, the panel unit 54 is located between the first case 44A and the second case 44B.

Specifically, when each side face of the panel unit 54 is abutted against each locking piece 4604 of the frame 46, the panel unit 54 is supported so as to be immovable in a direction orthogonal to the thickness direction thereof. Moreover, when the rear surface of the panel unit 54 is abutted on the main plate part 4602 of the frame 46, and the panel surface of the panel unit 54 is brought into elastic contact with the cushioning member 4430, the panel unit 54 will be sandwiched between the inner wall 4420 and the main plate part 4602 of the frame 46 in a state where the cushioning member 4430 is deformed elastically.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

Next, the configuration of a control system of the video camera 30 will be described.

Figure 7:
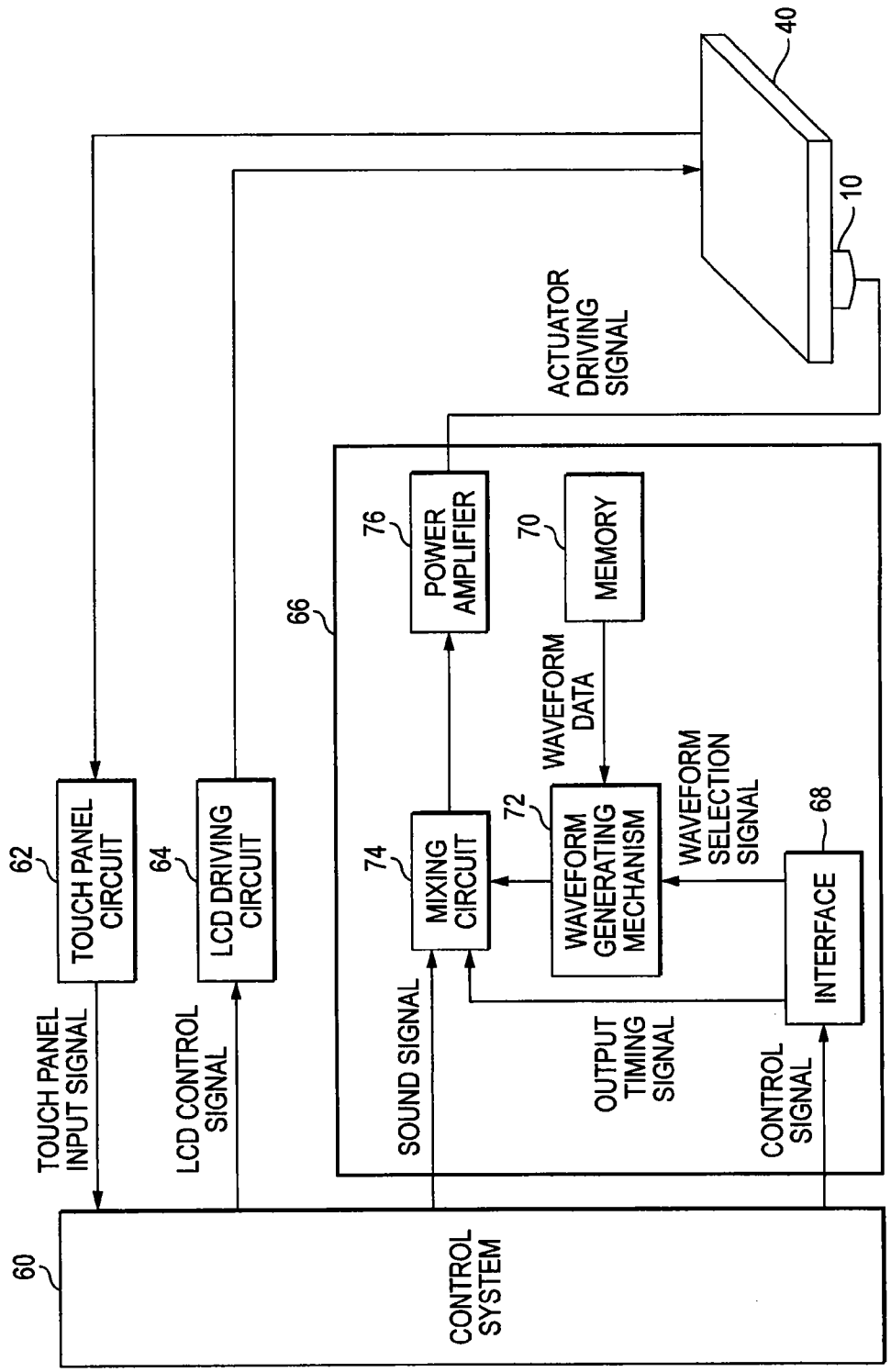
FIG. 7 is a block diagram showing the configuration of a control system of a video camera 30.
Figure 8:
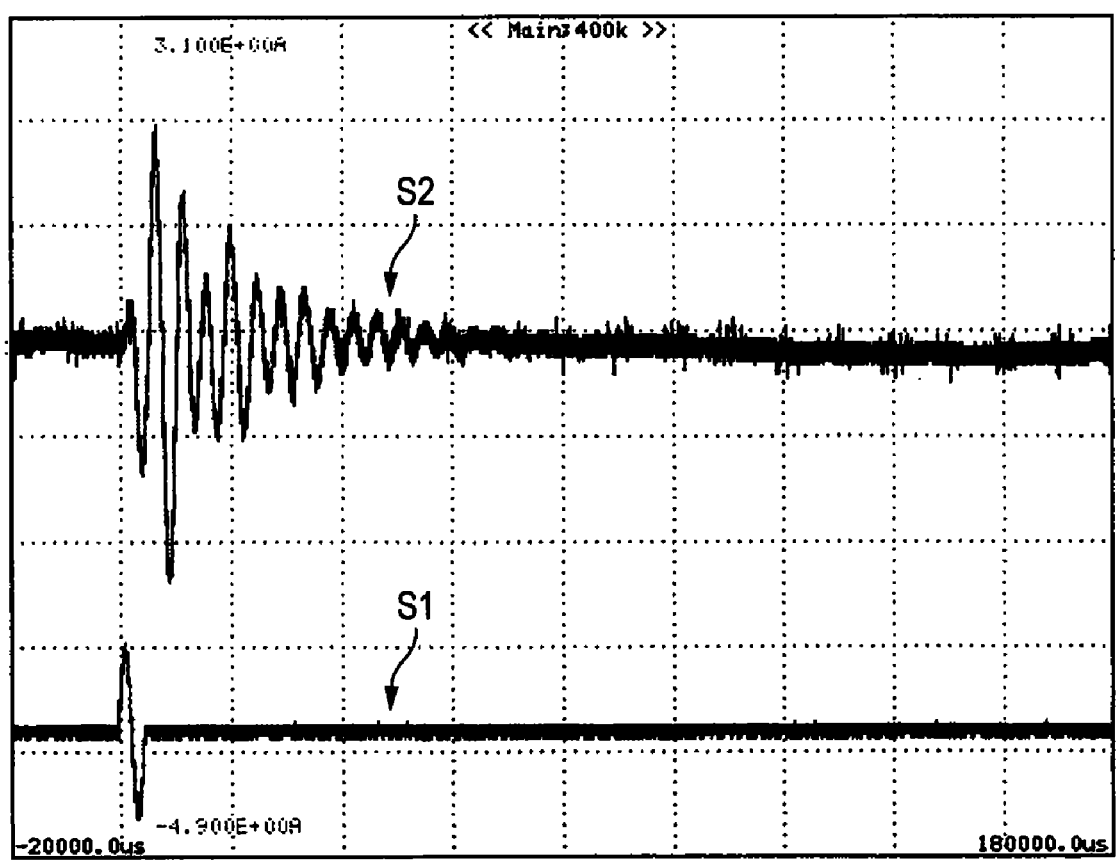
FIG. 8 is a waveform diagram showing a waveform of an actuator driving signal S1 and an output waveform S2 of a measuring device that shows the amount of displacement of a panel surface 5402 of a panel unit 54.
Figure 9:
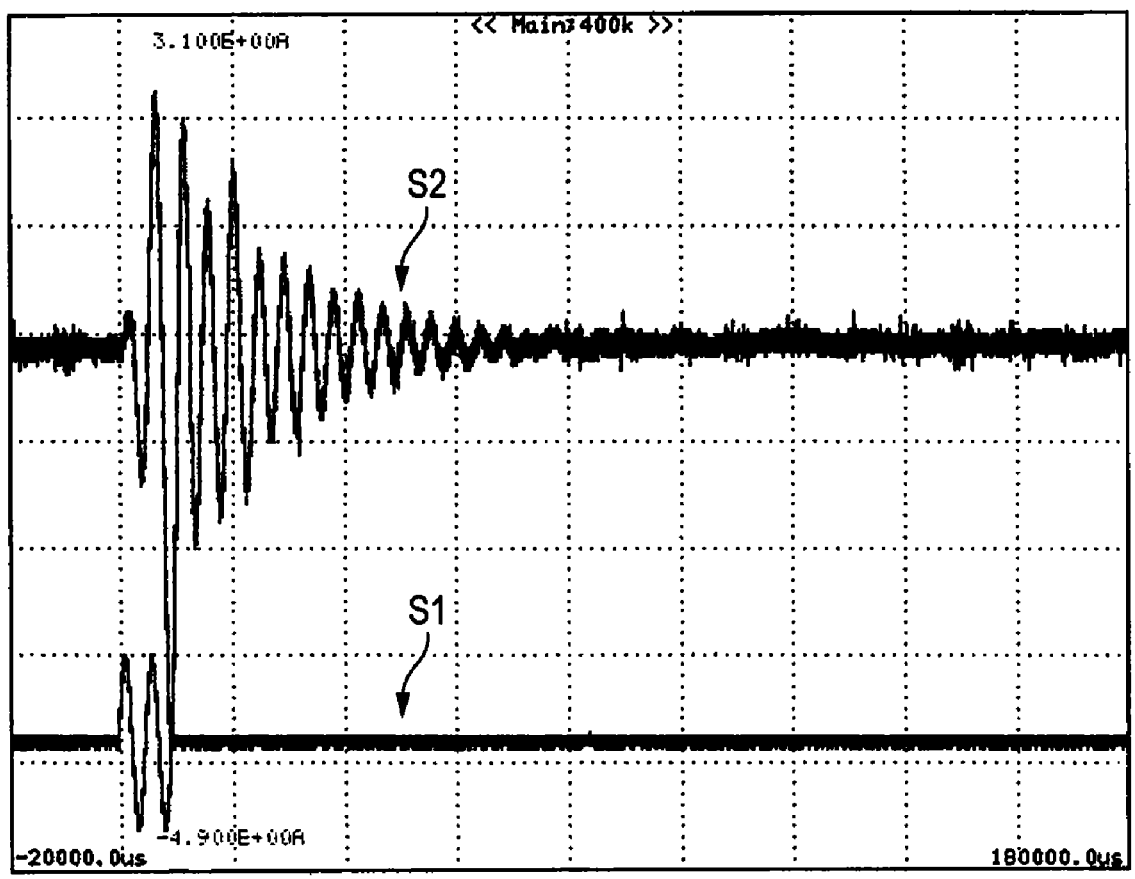
FIG. 9 is a waveform diagram showing a waveform of an actuator driving signal S1 and an output waveform S2 of a measuring device that shows the amount of displacement of the panel surface 5402 of the panel unit 54.
Figure 10:
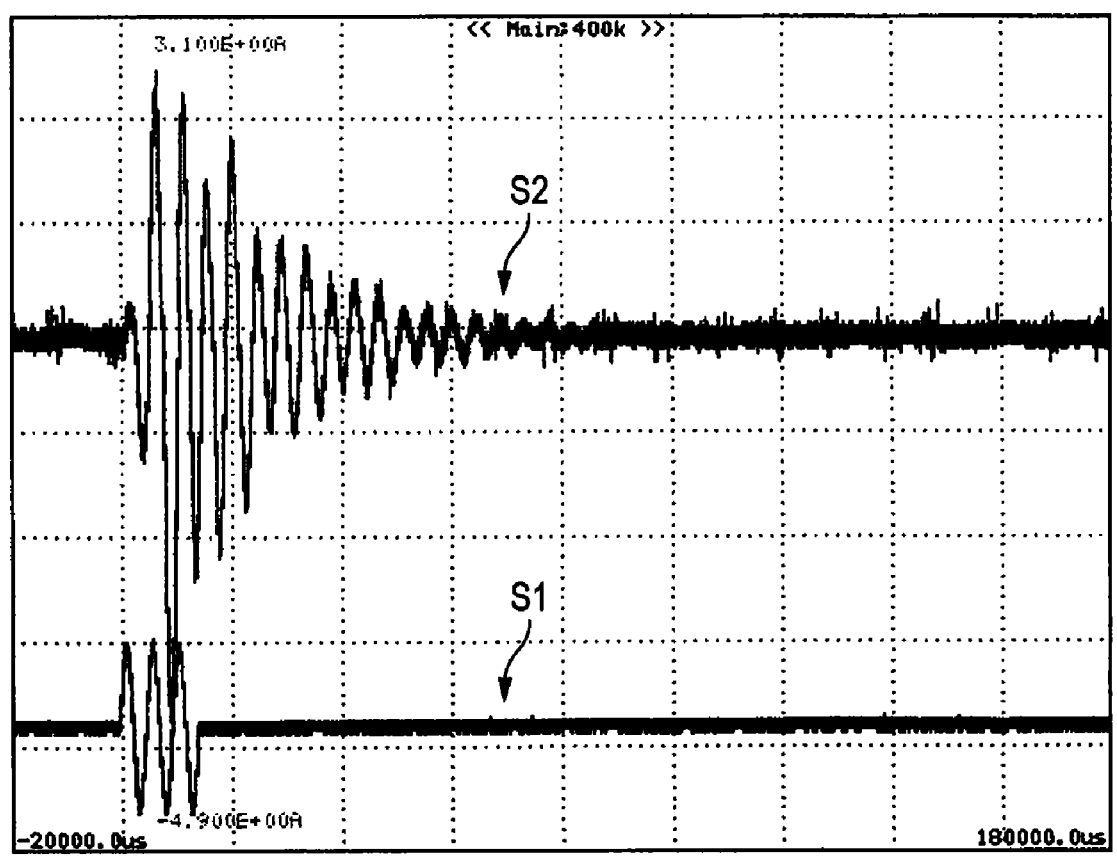
FIG. 10 is a waveform diagram showing a waveform of an actuator driving signal S1 and an output waveform S2 of a measuring device that shows the amount of displacement of the panel surface 5402 of the panel unit 54.
Figure 11:
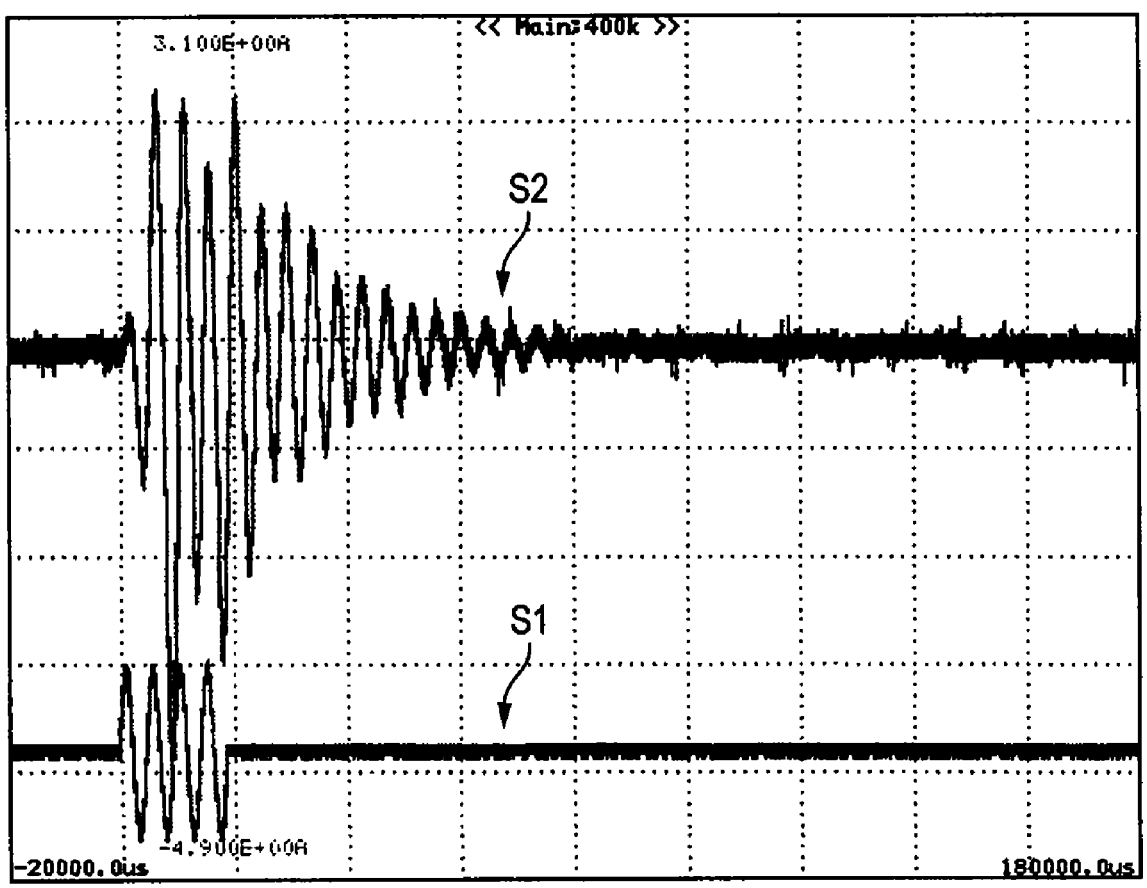
FIG. 11 is a waveform diagram showing a waveform of an actuator driving signal S1 and an output waveform S2 of a measuring device that shows the amount of displacement of the panel surface 5402 of the panel unit 54.
Figure 12:
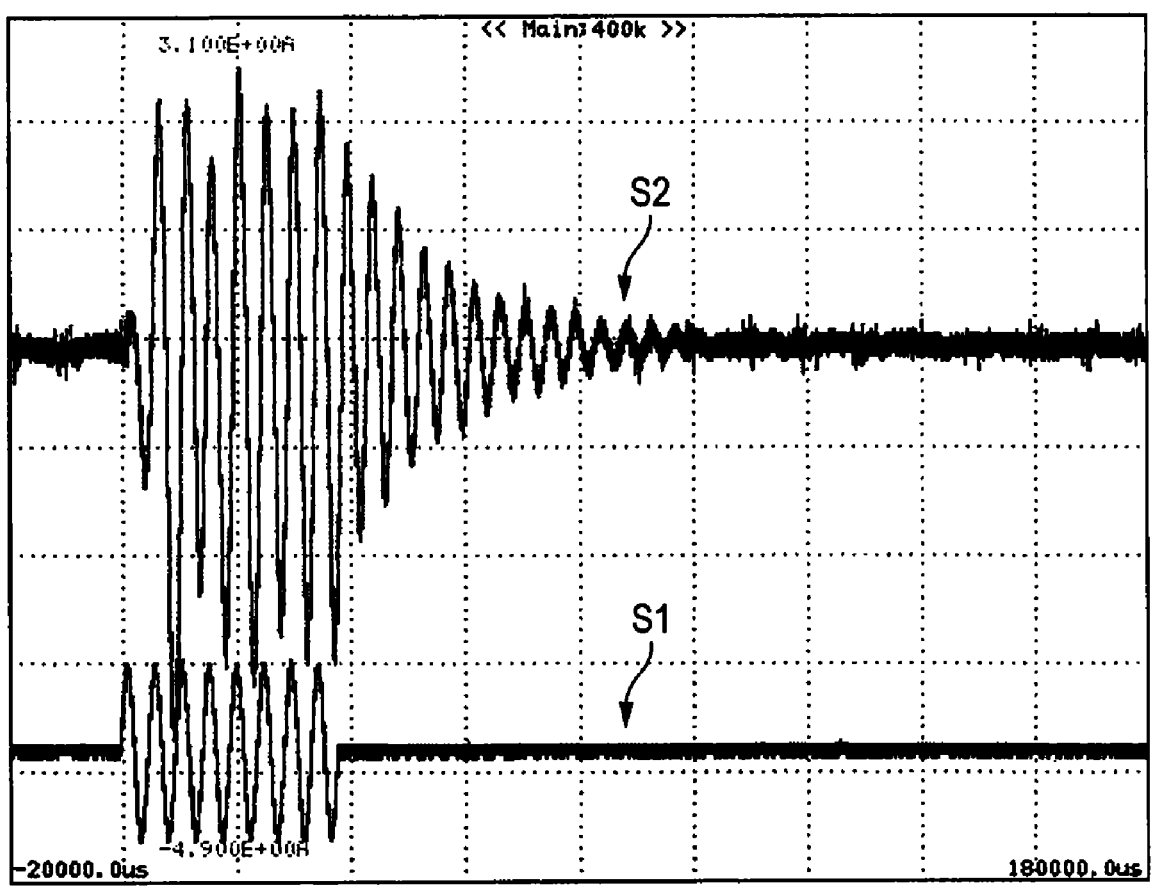
FIG. 12 is a waveform diagram showing a waveform of an actuator driving signal S1 and an output waveform S2 of a measuring device that shows the amount of displacement of the panel surface 5402 of the panel unit 54.
Figure 13:
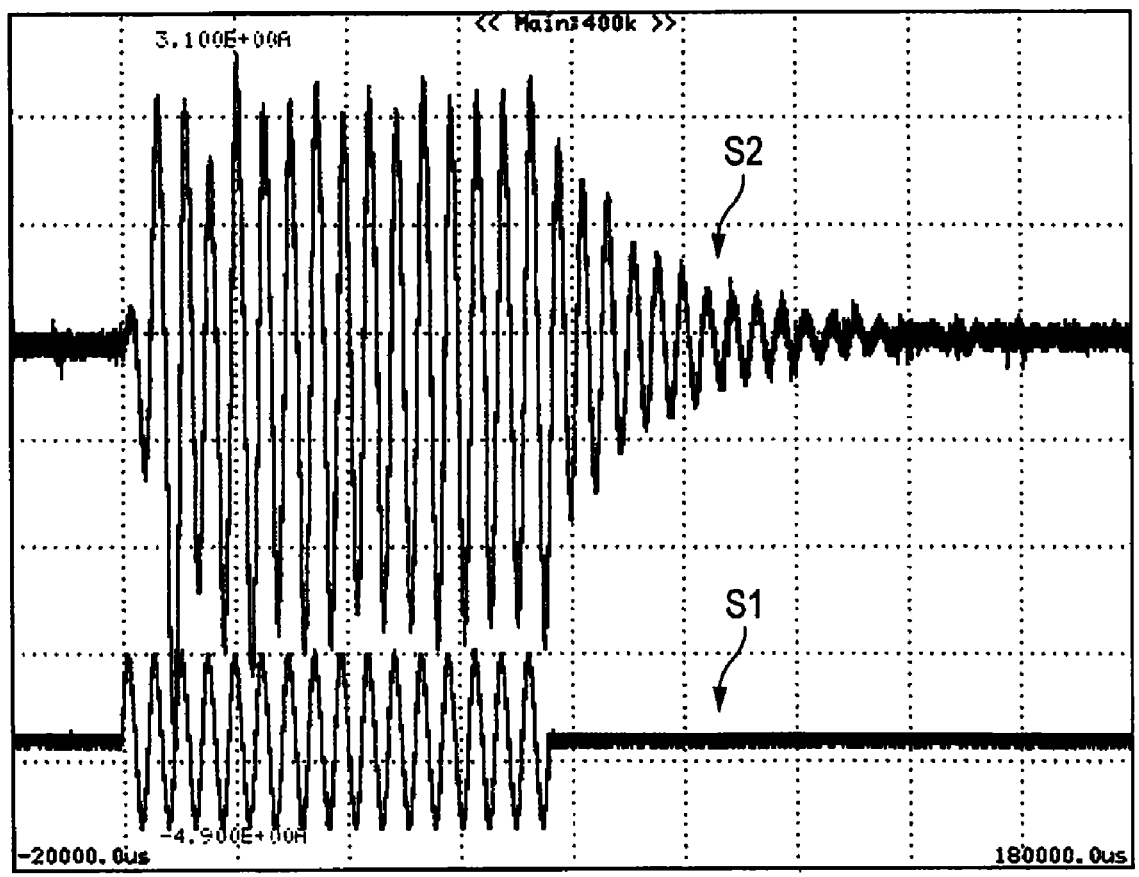
FIG. 13 is a waveform diagram showing a waveform of an actuator driving signal S1 and an output waveform S2 of a measuring device that shows the amount of displacement of the panel surface 5402 of the panel unit 54.

FIG. 7 is a block diagram showing the configuration of the control system of the video camera 30.

In FIG. 7, reference numeral 60 denotes a control system of the video camera 30 equipped with the touch panel display device 40. Control mechanisms and electronic circuits of the touch panel display device 40 are under the control of this control system 60.

The control mechanisms and electronic circuits of the touch panel display device 40 include a touch panel circuit 62 that is connected to the touch panel 50 of the panel unit 54, an LCD driving circuit 64 that is connected to the display panel 48 of the panel unit 54, and an actuator driving control mechanism 66 that controls driving of the actuator 10.

The touch panel circuit 62, which is a circuit annexed to a general touch panel, processes a signal obtained from a touch panel to generate a signal indicative of a position where the panel surface 5402 is touched by a user's finger.

The LCD driving circuit 64, which is a circuit annexed to a general liquid crystal touch panel, drives the display panel 48 according to an LCD control signal received from the control system 60 to perform visual display.

The actuator driving control mechanism 66 is composed of a one-chip computer including a central processing unit and a memory, and an electronic circuit, and includes an interface 68 to receive a control signal from the control system 60. The control signal received from the control system 60 includes an output timing signal and a waveform selection signal.

The actuator driving control mechanism 66 includes a memory 70. Data (waveform data) that is required for generation of a waveform corresponding to each of a plurality of waveforms is stored in the memory 70. Moreover, the actuator driving control mechanism 66 includes a waveform generating mechanism 72, a mixing circuit 74, and a power amplifier 76.

The waveform generating mechanism 72, which is a mechanism constituted by software, reads out data corresponding to a waveform designated by a waveform selection signal from the memory 70 and generates a waveform according to the read-out waveform data.

The mixing circuit 74 sends out an output signal having a waveform generated by the waveform generating mechanism 72 for a period designated by an output timing signal and also sends out a sound signal from the control system 60 as an output signal. Moreover, the mixing circuit is adapted not only to send out the output signal and the sound signal separately, but to send out a mixed signal of the output signal and the sound signal as one output signal.

Moreover, the power amplifier 76 amplifies an output signal from the mixing circuit 74 to supply the amplified output signal to the actuator 10 as an actuator driving signal. Accordingly, the actuator driving control mechanism 66 has a function as a means that causes the actuator driving signal to be overlapped with a sound signal.

A waveform generated in the waveform generating mechanism 72 is a vibration waveform. Some amplitudes, periods, and waveforms are constant, but other amplitudes, periods, and waveforms may vary. The waveform data stored in the memory 70 also includes data on amplitudes and periods.

Also, a piece of waveform data on a waveform designated by a waveform selection signal is read out among waveform data corresponding to a plurality of waveforms stored in the memory 70, and an actuator driving signal having the waveform is supplied to the actuator 10.

This causes the actuator 10 to vibrate. This vibration is transmitted to the panel unit 54 via the double-sided adhesive tape T from the housing 14, whereby the panel unit 54 will vibrate according to the waveform of the actuator driving signal.

Also, the vibration of the panel unit 54 generates a sense of touch corresponding to the waveform of the actuator driving signal in a user's finger tip that touches the panel surface 5402 of the panel unit 54. Accordingly, the actuator driving control mechanism 66 drives the panel unit 54 to vibrate the panel unit in a vibration pattern selected among a plurality of predetermined vibration patterns. Moreover, the plurality of predetermined vibration patterns generate senses of touch different from one another, in a user's finger tip that touches the panel surface 5402 of the panel unit 54.

Moreover, when the control system 60 sends out a sound signal to the actuator driving control mechanism 66, the sound signal is also supplied to the actuator 10 while being overlapped with the actuator driving signal.

It is noted herein that the waveform generated by the waveform generating mechanism 72 and the sound signal overlapped with the waveform have different frequency bands.

Since the waveform generated by the waveform generating mechanism 72 is intended to generate a sense of touch in a user's finger tip, the vibration frequency is set to about 60 Hz to 200 Hz for the purpose of being subtly sensed by the user's finger tip.

On the other hand, the frequency of the sound signal is approximately 800 Hz to 1600 Hz. Therefore, when the touch panel display device 40 emits sound, the sense of touch generated in the finger tip is not so great even if a user touches the panel surface of the panel unit 54 with his/her finger tip.

In addition, the circuits that supply a driving signal to the actuator 10 and generate a sound signal are not limited to the above-described configuration. For example, various signal generating circuits that are known in the related art can be employed.

Moreover, in the present embodiment, the actuator driving signal and the sound signal overlapped with the actuator driving signal constitute an electrical signal in the claims, and the touch panel circuit 62, the control system 60, and the actuator driving control mechanism 66 constitute a driving circuit in the claims.

Accordingly, according to the above-described touch panel display device 40 and the video camera 30, the actuator 10 can be used to generate a sense of touch in a user's finger tip that operates the touch panel display device 40, and miniaturization of the actuator 10 used for the touch panel display device 40 can be realized and great vibration can be generated by the actuator 10 as well as sound can be output by the actuator 10. Therefore, a sense of touch can be surely generated in a user's finger tip that operates the touch panel display device 40 while the touch panel display device 40 and the video camera 30 can be miniaturized. This is advantageous to improve operability.

Moreover, since the touch panel display device 40 is miniaturized using the actuator 10, it also becomes considerably advantageous as an input/output device of a mobile electronic apparatus.

Next, conditions of an actuator driving signal to be supplied to the actuator 10 will be described.

If there is a great time difference between the timing with which vibration is sensed with a user's finger tip and the timing with which sound is sensed with user's ears when vibration and sound is generated by the actuator 10, a user will feel uncomfortable. Accordingly, it is necessary to reduce the time difference between the vibration and the sound as much as possible.

On the other hand, since power consumption increases as the time taken to supply an actuator driving signal to the actuator 10 is longer, it is necessary to suppress the supply time of the actuator driving signal.

Therefore, it is desirable to minimize user discomfort and to reduce the supply time of the actuator driving signal.

The inventors have found out conditions of the supply time that are optimal for an actuator driving signal on the basis of the following test results.

Specifically, displacement that is made in the panel surface 5402 of the panel unit 54 was measured by a measuring device while the number of times of supply of actuator driving signals to the actuator was is varied.

FIGS. 8 to 13 are waveform diagrams showing a waveform of an actuator driving signal S1 and an output waveform S2 of a measuring device that shows the amount of displacement of the panel surface 5402 of the panel unit 54.

In FIGS. 8 to 13, the abscissa axis is a time axis that is plotted by 20 ms/div, and the ordinate axis is a voltage axis that is plotted by 5 V/div for the actuator driving signal S1 and by 0.1 V/div for the output waveform S2 of the measuring device.

Moreover, the actuator driving signal S1 is an alternating signal, and the amplitude thereof is 8 Vp-p and the frequency thereof is 210 Hz.

In a case where the actuator driving signal S1 for one period to be supplied to the actuator 10 (specifically, coil 16) is counted as one time, FIGS. 8 to 13 respectively show cases where the number of times of supply of actuator driving signals S1 (BURST frequency) are one, two, three, four, eight, and sixteen. Here, as the number of times of supply of actuator driving signals S1 increases, the amount of displacement becomes large, and the vibrating time becomes long.

Figure 14:
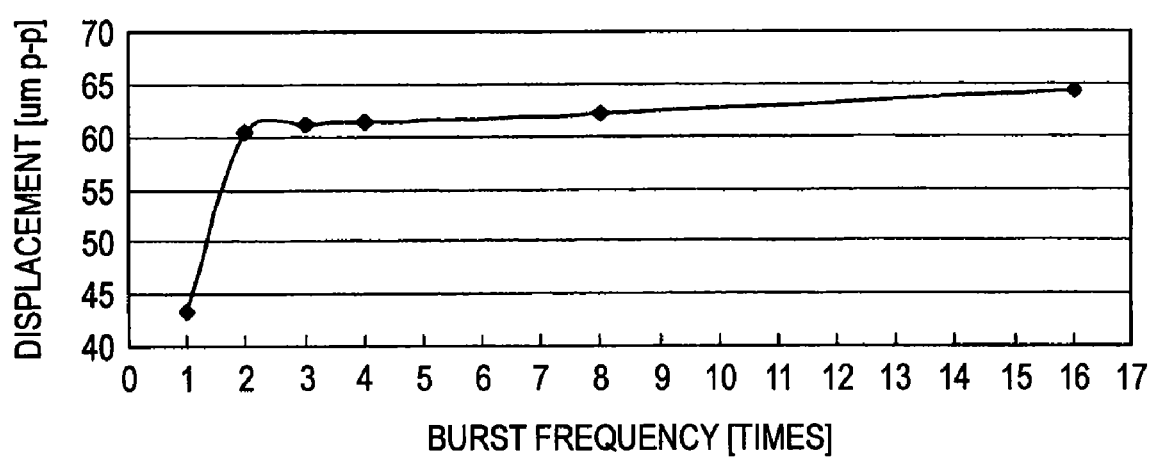
FIG. 14 is a graph showing the relationship between the number of times of supply of actuator driving signals (BURST frequency) and the amount of displacement of the panel surface 5402 of the panel unit 54.

FIG. 14 is a graph showing the relationship between the number of times of supply of actuator driving signals (BURST frequency) and the amount of displacement of the panel surface 5402 of the panel unit 54, and FIG. 14 is plotted on the basis of test results of FIGS. 8 to 13.

As shown in FIG. 14, if the number of times of supply of actuator driving signals (BURST frequency) is two or more, the amount of displacement of the panel surface 5402 of the panel unit 54 reaches nearly an upper limit. For this reason, if the number of times of supply of actuator driving signals (BURST frequency) is two or more, vibration can be transmitted to a user's finger tip with almost the same magnitude regardless of a large or small number of times of supply.

Moreover, as for a sound signal, such as a beep sound that is generated when the touch panel 402 is touched by a user's finger tip, the generation time thereof is about 0.3 sec.

In a case where vibration is generated after the sound signal is generated for 0.3 sec, since a time difference until a user feels vibration from the generation of the sound is 0.3 sec, a user feels discomfort. In order not to give such an uncomfortable feeling, it is preferable to generate sound after vibration is generated.

Moreover, in a case where the actuator driving signal (electrical signal) is an alternating signal as mentioned above, and the frequency thereof is about 200 Hz, if the number of times of supply of actuator driving signals to be supplied to the coil 16 is five or less, in other words, if the vibration generation time from the actuator 10 is below about 25 msec, a user cannot feel a time difference between vibration and sound when the sound is generated after the vibration is generated.

From the above description, in a case where the frequency of an actuator driving signal is about 200 Hz, if the number of times of supply of actuator driving signals S1 to be supplied to the coil 16 in order to vibrate the housing 14 is set to two to five, a user can be prevented from feeling uncomfortable due to a time difference between sound and vibration as well as vibration can be surely given to a user's finger tip. This is advantageous to improve the feeling of use. Moreover, power consumption can be reduced by suppressing the supply time of actuator driving signals.

Second Embodiment

Next, a second embodiment will be described.

The second embodiment is a modified example of the first embodiment, and is different from the first embodiment in that the weight increasing member WM is attached to an end face of the magnet 18 that faces the diaphragm 12.

Figure 15:
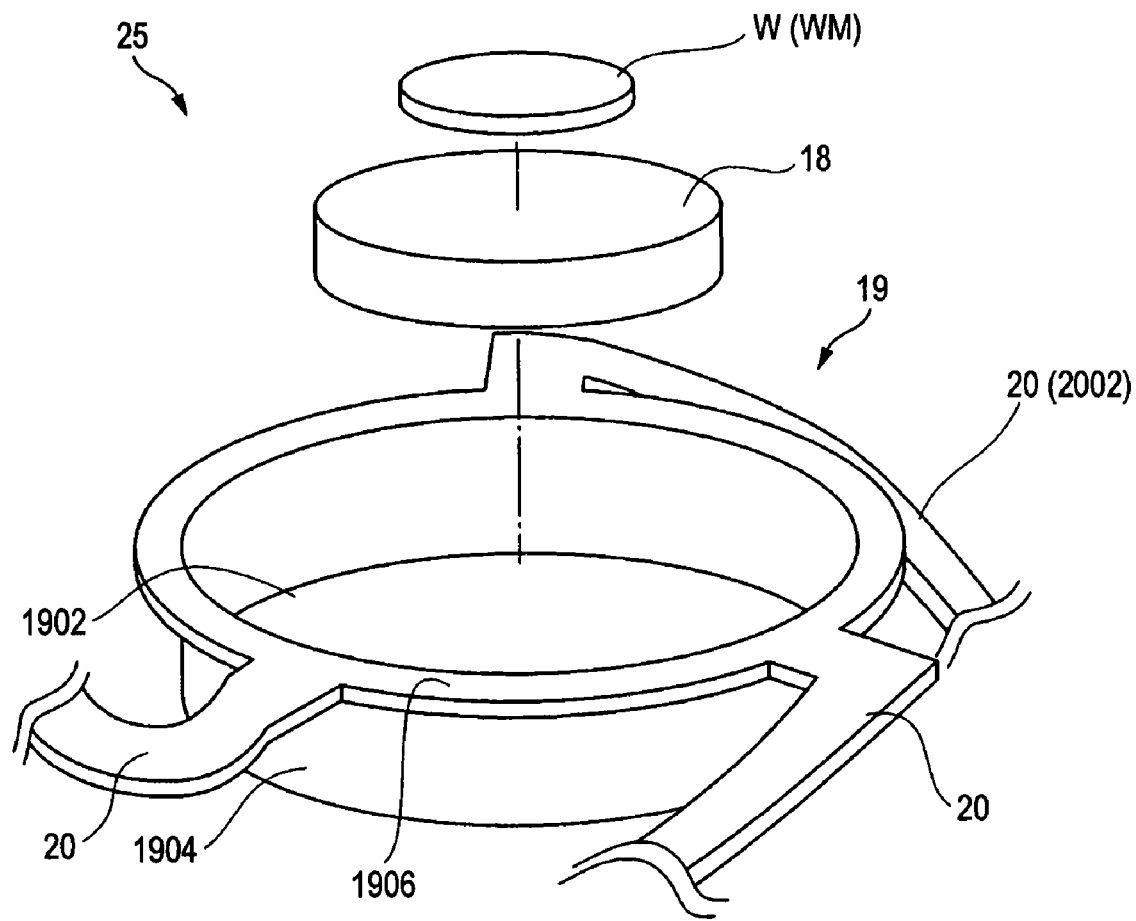
FIG. 15 is a perspective view of principal parts of an actuator 10 according to a second embodiment.
Figure 16:
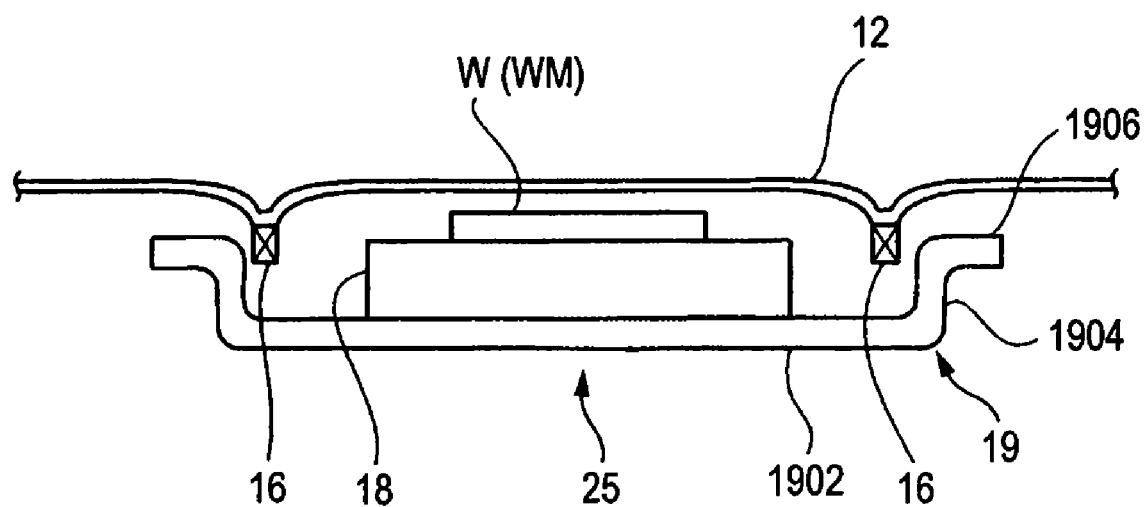
FIG. 16 is a sectional view of FIG. 15.

FIG. 15 is a perspective view of principal parts of the actuator 10 according to the second embodiment, and FIG. 16 is a sectional view of FIG. 15. In addition, the following embodiment will be described with the parts and members that are the same or similar to those of the first embodiment being denoted by the same reference numerals.

As shown in FIGS. 15 and 16, the magnet 18 is formed in the shape of a disc, and the magnet is placed on the bottom wall 1902 and is fixedly bonded with adhesive in a state where it is positioned such that the axis of the magnet 18 coincides with the axis of the coil 16.

The weight increasing member WM is formed in the shape of a disc having a diameter that is one size smaller than the magnet 18, and the weight increasing member is placed on an end face of the magnet 18 that faces the diaphragm 12, and is fixedly bonded with adhesive in a state where it is positioned such that the axis of the weight increasing member WM coincides with the axis of the coil 16.

The second embodiment also exhibits the same effects as the first embodiment.

Third Embodiment

Next, a third embodiment will be described.

The third embodiment is a modified example of the first embodiment, and is different from the first embodiment in that the weight increasing member WM is fitted between the magnet 18 and the bottom wall 1902 of the yoke 19.

Figure 17:
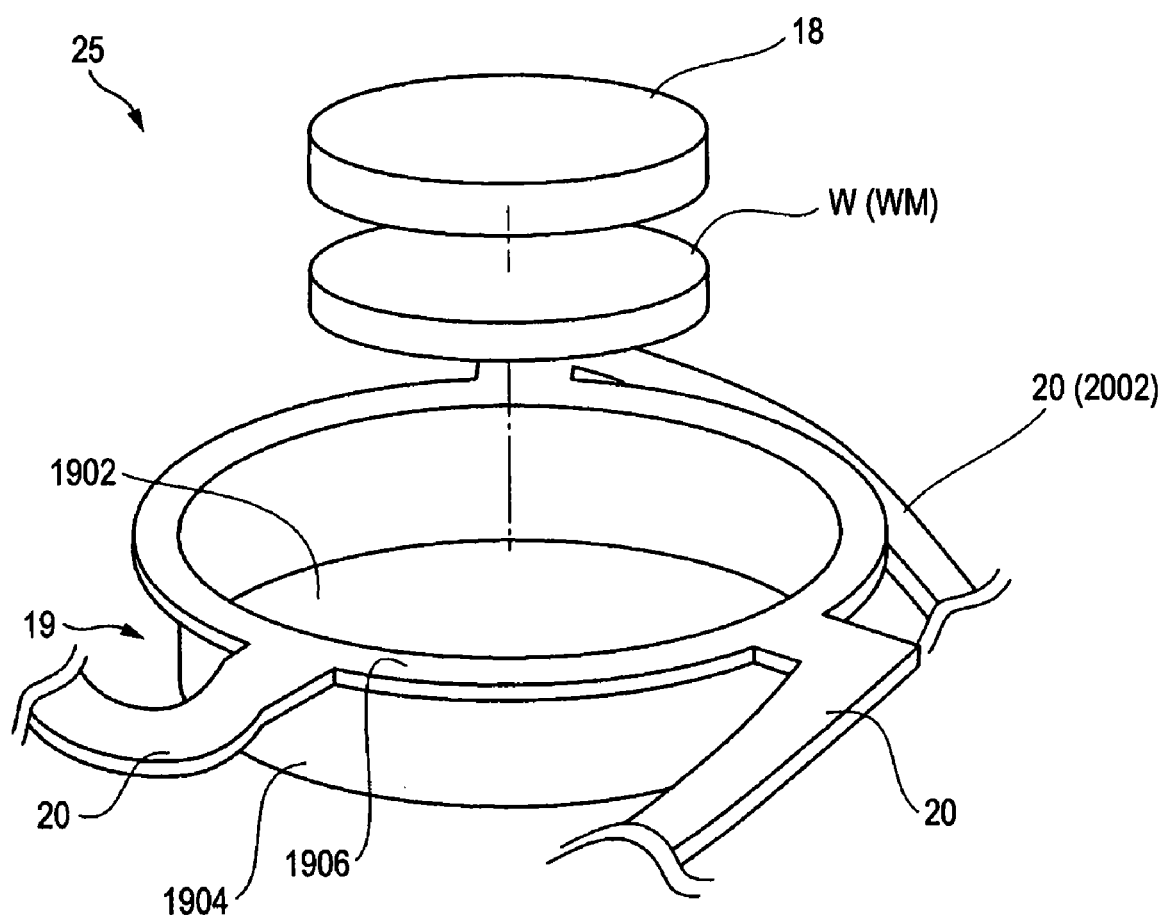
FIG. 17 is a perspective view of principal parts of an actuator 10 according to a third embodiment.
Figure 18:
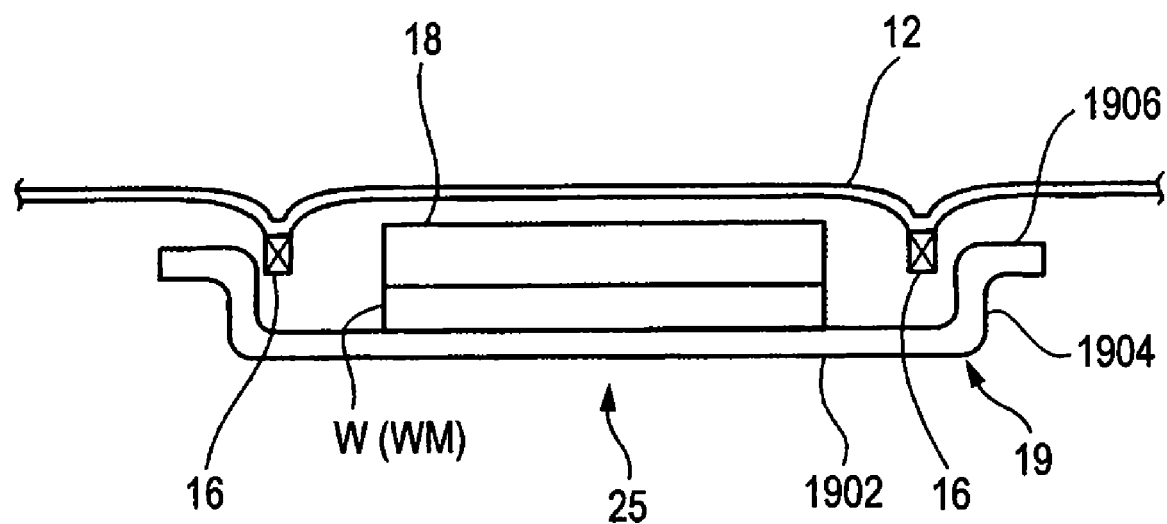
FIG. 18 is a sectional view of FIG. 17.

FIG. 17 is a perspective view of principal parts of the actuator 10 according to the third embodiment, and FIG. 18 is a sectional view of FIG. 17.

As shown in FIGS. 17 and 18, the magnet 18 is formed in the shape of a disc, and the weight increasing member WM is formed in the shape of a disc having the same diameter as the magnet 18.

The weight increasing member WM is placed on the bottom wall 1902 of the yoke 19, and is fixedly bonded with adhesive in a state where it is positioned such that the axis of the weight increasing member WM coincides with the axis of the coil 16.

The magnet 18 is placed on an end face of the weight increasing member WM that faces the diaphragm 12, and is fixedly bonded with adhesive in a state where it is positioned such that the axis of the magnet coincides with the axis of the coil 16.

The third embodiment also exhibits the same effects as the first embodiment.

Fourth Embodiment

Next, a fourth embodiment will be described.

The fourth embodiment is a modified example of the first embodiment, and is different from the first embodiment in that the weight increasing member WM is formed in the shape of an annular plate, and is fitted between the magnet and the bottom wall 1902 of the yoke 19.

Figure 19:
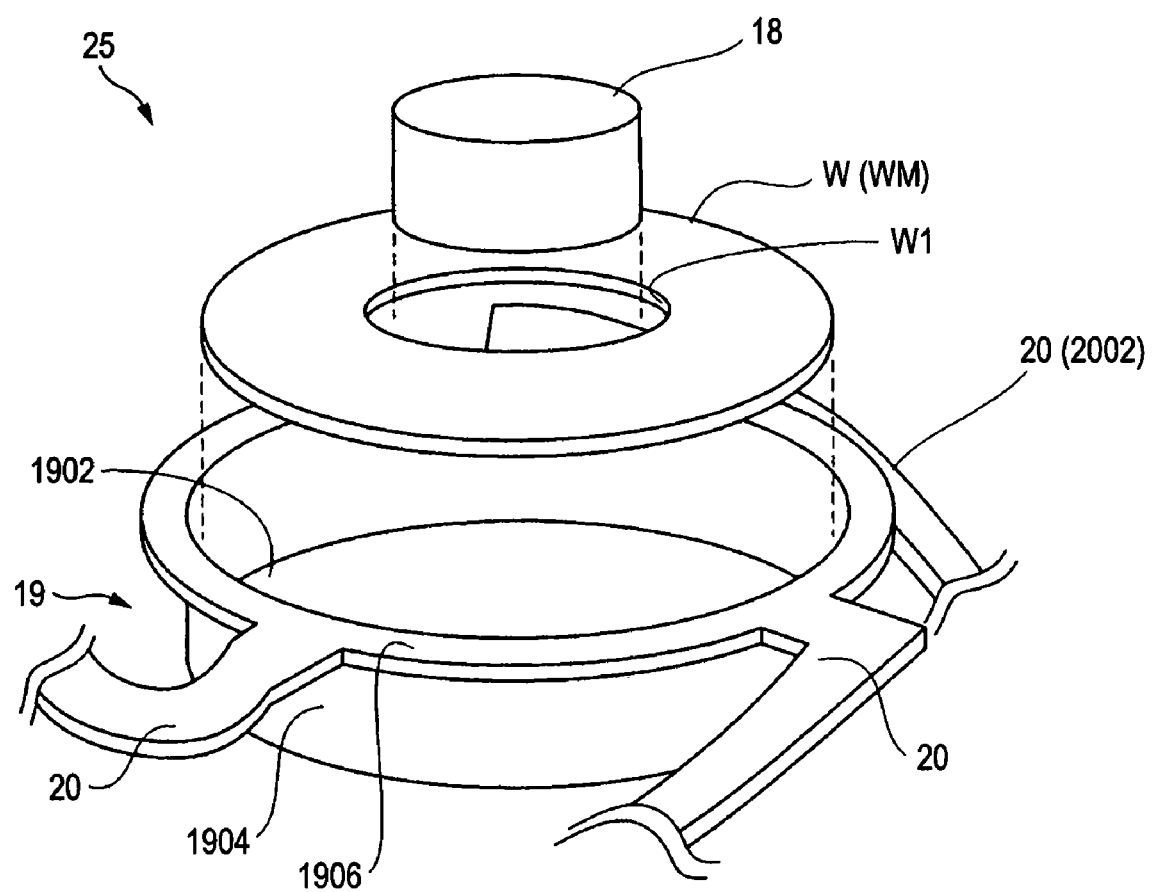
FIG. 19 is a perspective view of principal parts of an actuator 10 according to a fourth embodiment.
Figure 20:
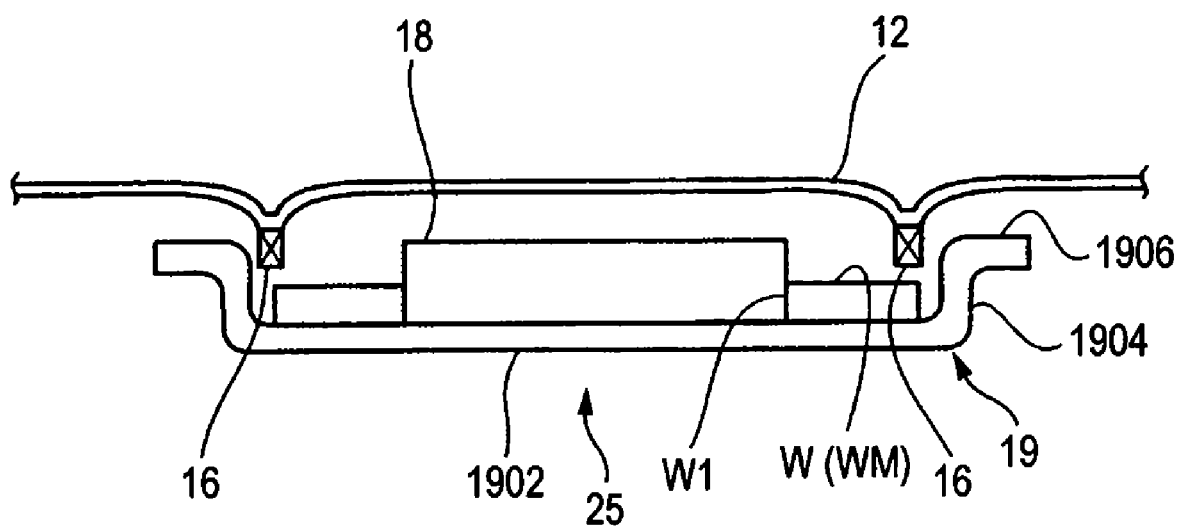
FIG. 20 is a sectional view of FIG. 19.

FIG. 19 is a perspective view of principal parts of the actuator 10 according to the fourth embodiment, and FIG. 20 is a sectional view of FIG. 19.

As shown in FIGS. 19 and 20, the magnet 18 is formed in the shape of a disc.

The weight increasing member WM is formed in the shape of an annular plate having a diameter that is slightly smaller than the diameter of the bottom wall 1902 of the yoke 19, and has formed in the center thereof a hole W1 having an inner diameter such that the magnet 18 can be accommodated.

The weight increasing member WM is placed on the bottom wall 1902 of the yoke 19, and is fixedly bonded with adhesive in a state where it is positioned such that the axis of the weight increasing member coincides with the axis of the coil 16.

The magnet 18 is accommodated within the hole W1, and the magnet is placed on the bottom wall 1902 of the yoke 19, and is fixedly bonded with adhesive in a state where it is positioned such that the axis of the magnet coincides with the axis of the coil 16.

The fourth embodiment also exhibits the same effects as the first embodiment.

Fifth Embodiment

Next, a fifth embodiment will be described.

The fifth embodiment is a modified example of the first embodiment, and is different from the first embodiment in that the weight increasing member WM is formed in the shape of an annular plate and is attached to a lower face of the flange part 1906 of the yoke 19.

Figure 21:
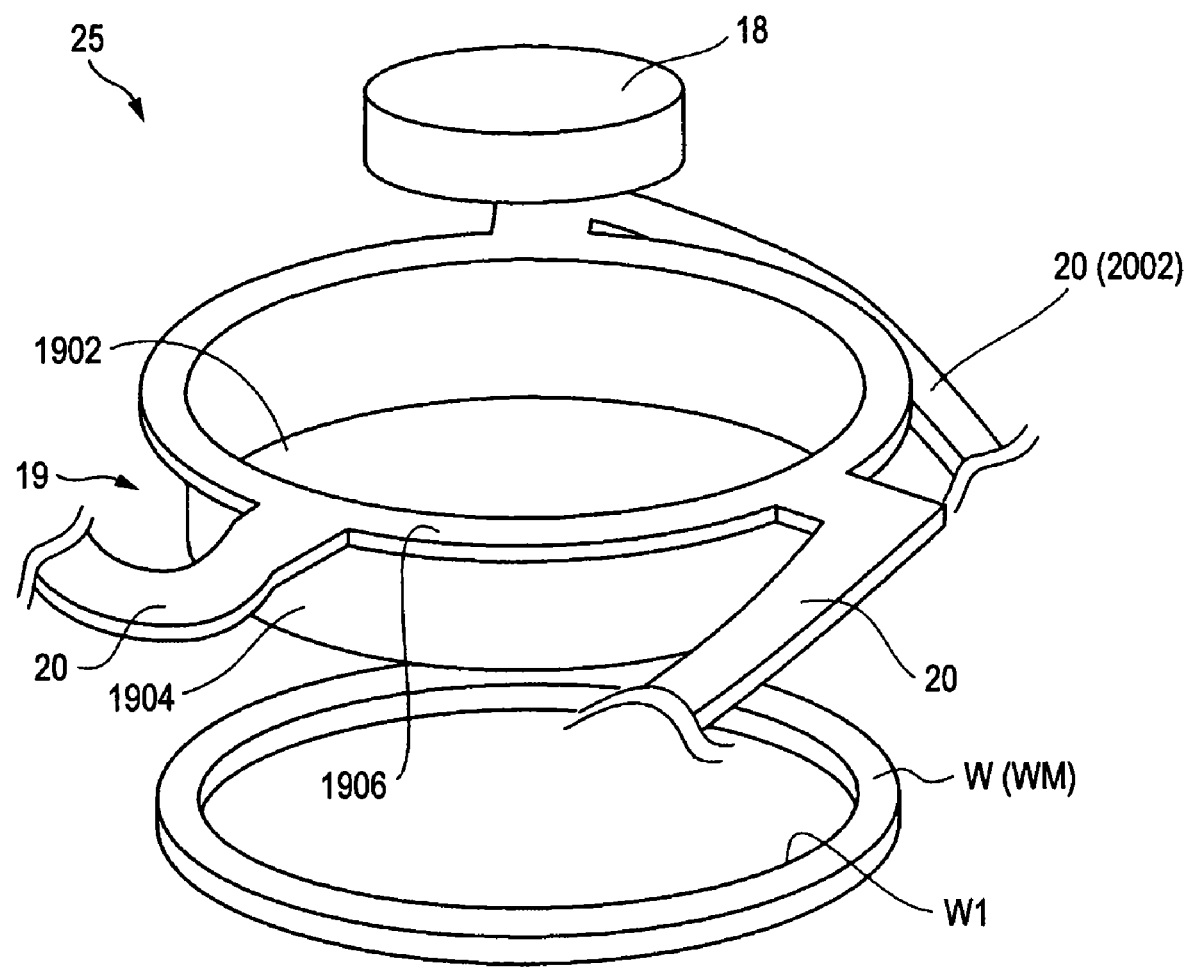
FIG. 21 is a perspective view of principal parts of an actuator 10 according to a fifth embodiment.
Figure 22:
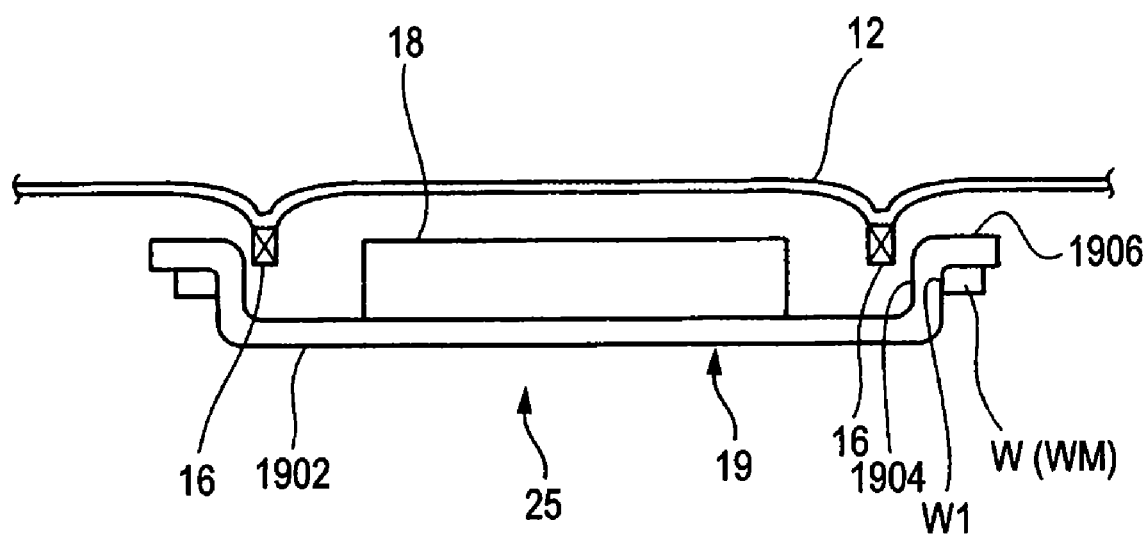
FIG. 22 is a sectional view of FIG. 21.

FIG. 21 is a perspective view of principal parts of the actuator 10 according to the fifth embodiment, and FIG. 22 is a sectional view of FIG. 21.

As shown in FIGS. 21 and 22, the magnet 18 is formed in the shape of a disc.

The weight increasing member WM is formed in the shape of an annular plate and has a hole W1 having an inner diameter that is slightly larger than the outer diameter of the side wall 1904 of the yoke 19, and the weight increasing member is attached to the lower face of the flange part 1906 with adhesive in a state where it is positioned such that the axis of the weight increasing member coincides with the axis of the coil 16.

The fifth embodiment also exhibits the same effects as the first embodiment.

Sixth Embodiment

Next, a sixth embodiment will be described.

In the sixth embodiment, weight increasing parts W are provided along portions of the yoke 19.

Figure 23:
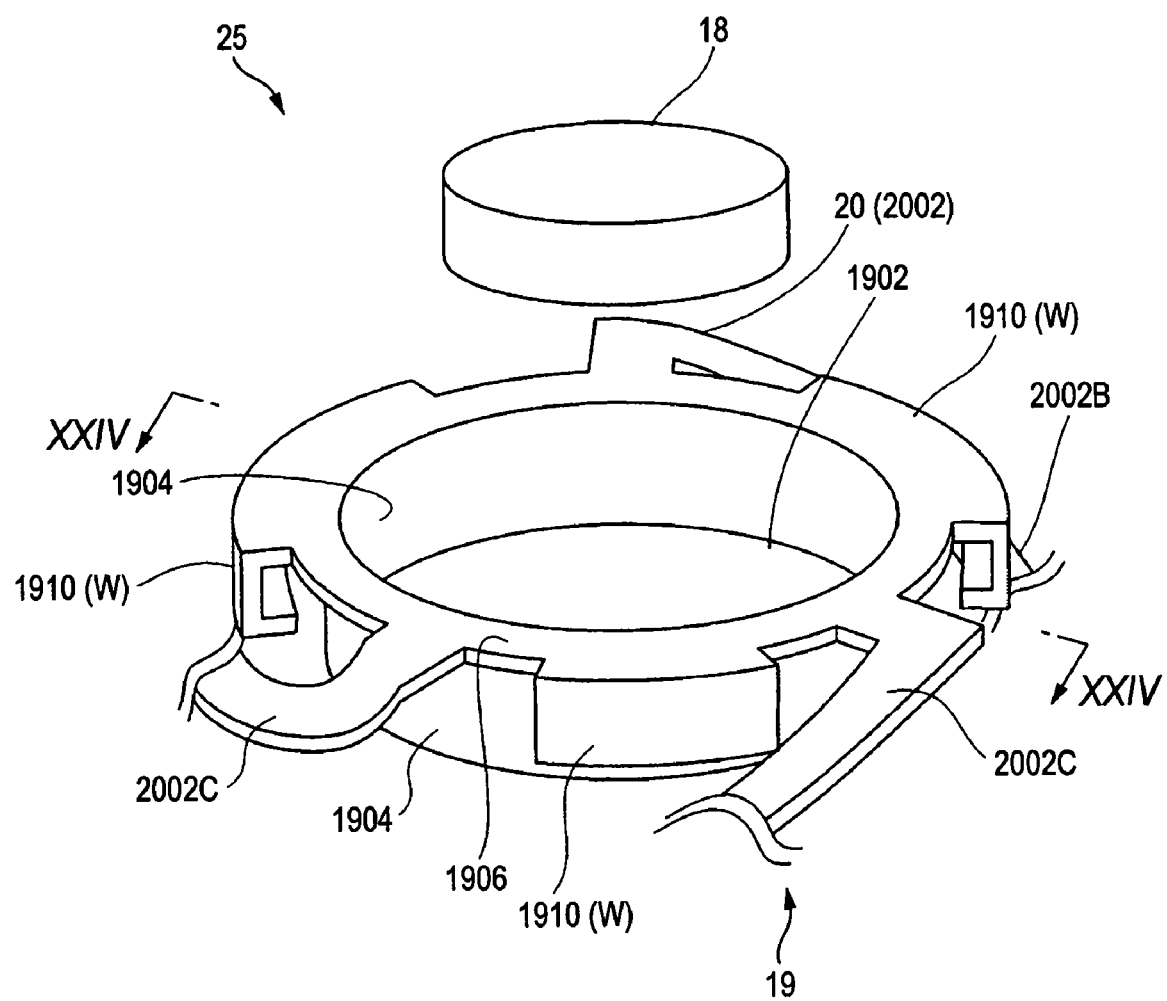
FIG. 23 is a perspective view of principal parts of an actuator 10 according to a sixth embodiment.
Figure 24:
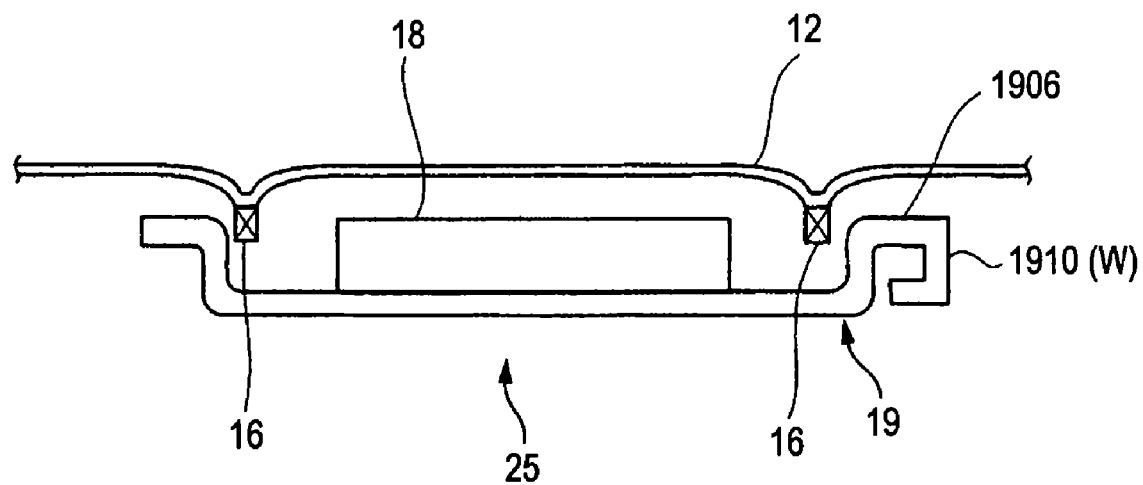
FIG. 24 is a sectional view taken along line XXIV-XXIV of FIG. 23.

FIG. 23 is a perspective view of principal parts of the actuator 10 according to the sixth embodiment, and FIG. 24 is a sectional view taken along line XXIV-XXIV of FIG. 23.

As shown in FIGS. 23 and 24, the magnet 18 is formed in the shape of a disc, and the magnet 18 is placed on the bottom wall 1902 of the yoke 19, and is fixedly bonded with adhesive in a state where it is positioned such that the axis of the magnet coincides with the axis of the coil 16.

Bending sections 1910 are formed radially outside the flange part 1906 in a plurality of spots at regular intervals in a peripheral direction of the flange part 1906 of the yoke 19. The bending sections 1910 are configured so as to be the same in weight. Each of the bending section 1910 is formed in a spot between the portions where the second rectilinear sections 2002 of the spring 20 are connected to the flange part 1906.

In the present embodiment, these bending sections 1910 constitute the weight increasing part W.

Moreover, in the present embodiment, the yoke 19 and the bending sections 1910 are integrally formed by performing pressing, such as bending, drawing, or punching, thereby achieving cost reduction and reliability improvement by virtue of a reduction in the number of parts.

Accordingly, the sixth embodiment also exhibits the same effects as the first embodiment.

Seventh Embodiment

Next, a seventh embodiment will be described.

The seventh embodiment is a modified example of the sixth embodiment.

Figure 25:
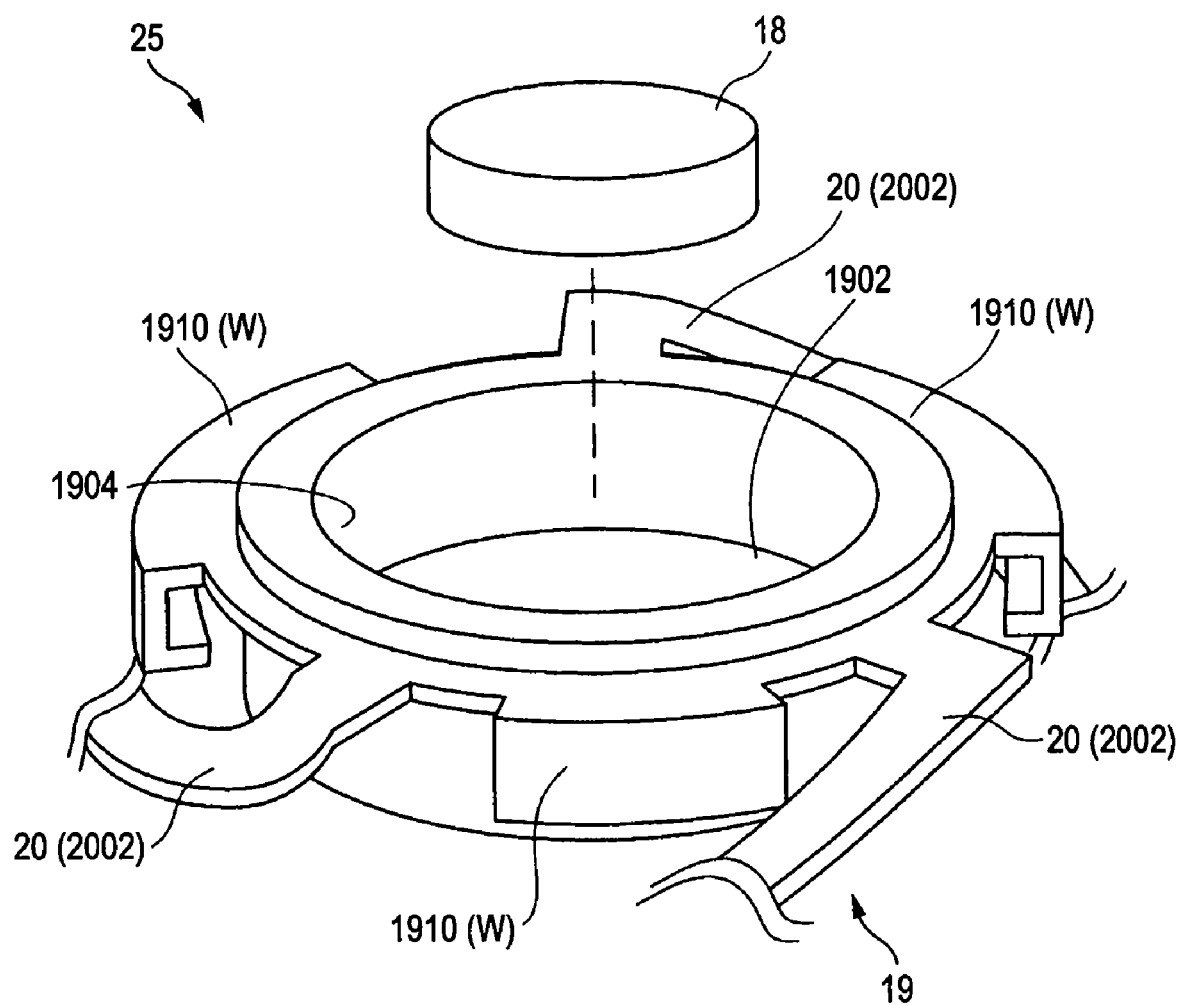
FIG. 25 is a perspective view of principal parts of an actuator 10 according to a seventh embodiment.
Figure 26:
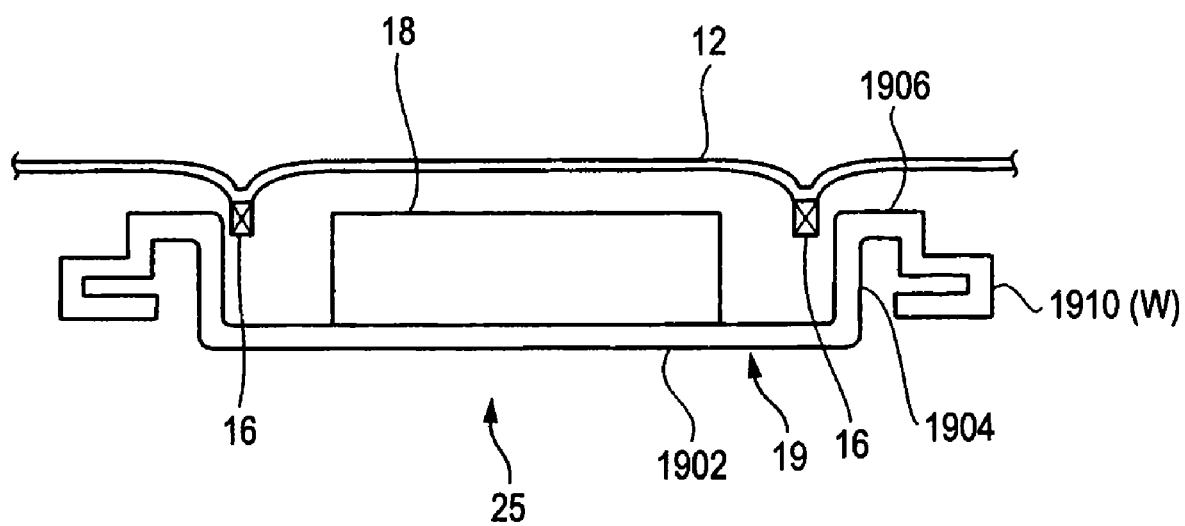
FIG. 26 is a sectional view taken along line XXVI-XXVI of FIG. 25.

FIG. 25 is a perspective view of principal parts of the actuator 10 according to the seventh embodiment, and FIG. 26 is a sectional view taken along line XXVI-XXVI of FIG. 25.

As shown in FIGS. 25 and 26, the seventh embodiment is different from the sixth embodiment in that the bending sections 1910 are formed in a state where they are displaced nearer towards the bottom wall 1902 than the flange part 1906 in terms of the layout of various members to be disposed in the accommodating space S.

Moreover, even in the present embodiment similar to the sixth embodiment, the yoke 19 and the bending sections 1910 are integrally formed by performing pressing, such as bending, drawing, or punching, thereby achieving cost reduction and reliability improvement by virtue of a reduction in the number of parts.

Accordingly, the seventh embodiment also exhibits the same effects as the first embodiment.

Eighth Embodiment

Next, an eighth embodiment will be described.

Figure 27:
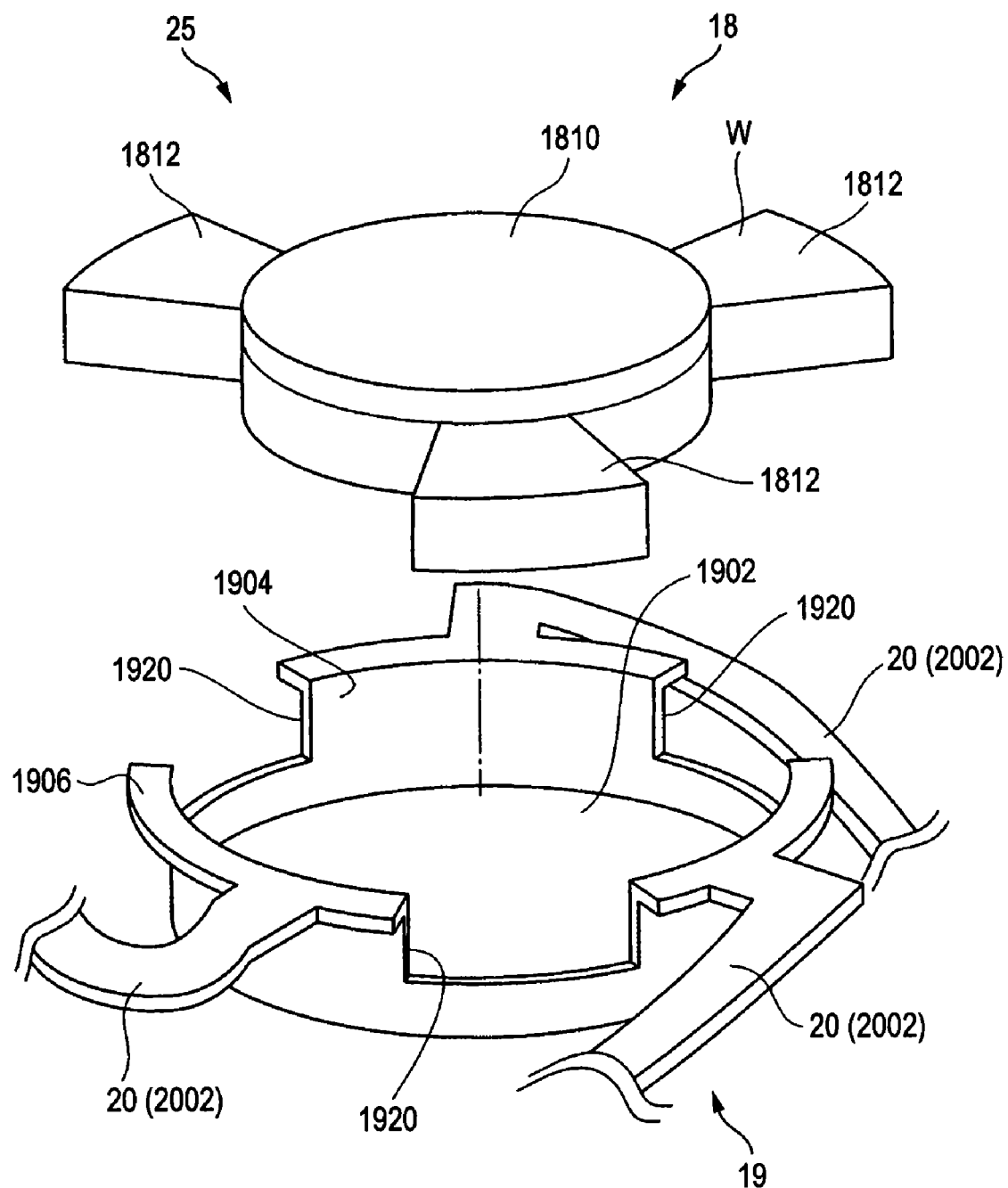
FIG. 27 is a perspective view of principal parts of an actuator 10 according to an eighth embodiment.
Figure 28:
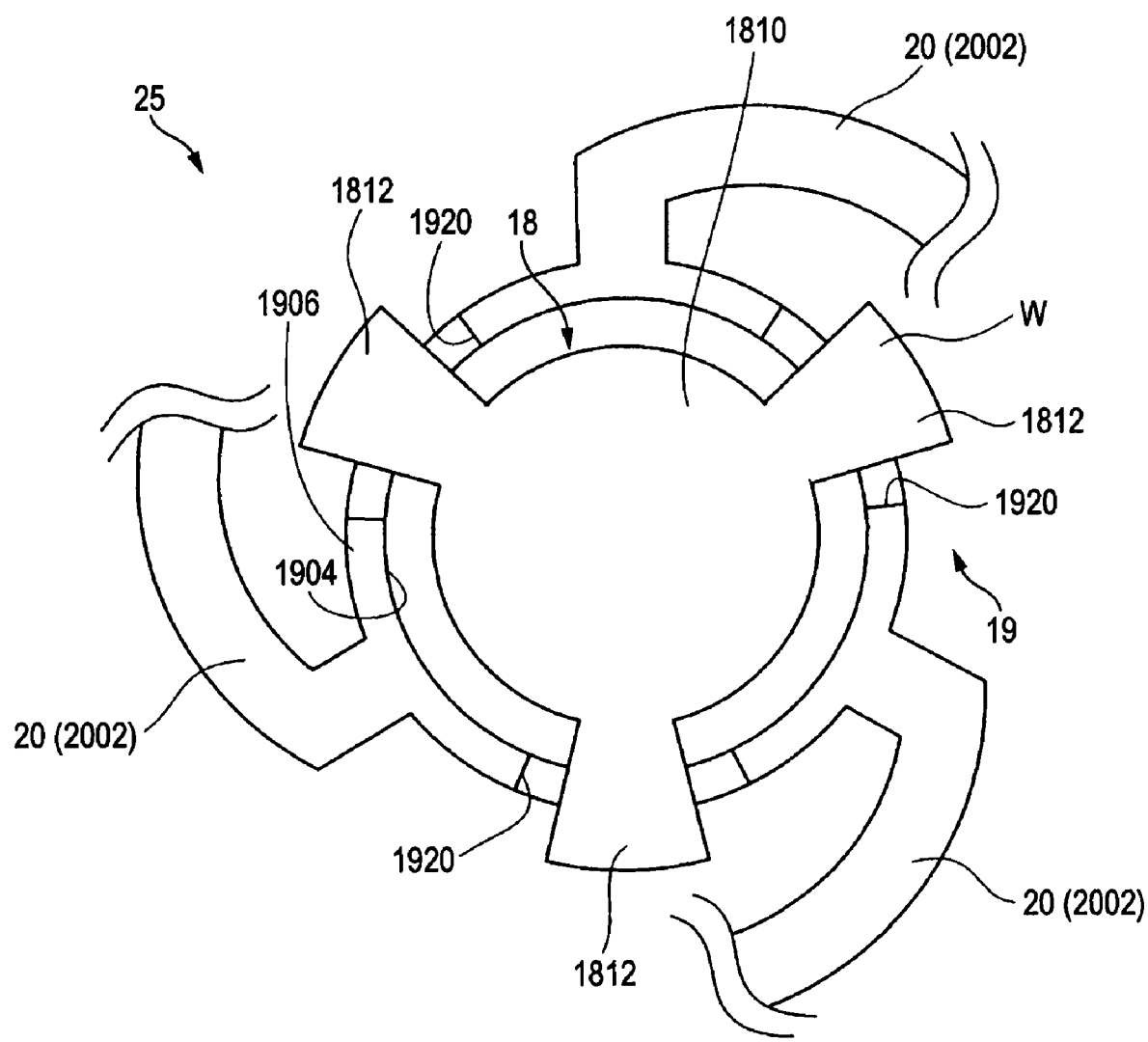
FIG. 28 is a plan view of FIG. 27.

FIG. 27 is a perspective view of principal parts of the actuator 10 according to the eighth embodiment, and FIG. 28 is a plan view of FIG. 27.

The magnet 18 has a cylindrical part 1810 and three bulged parts 1812.

The cylindrical part 1810 is attached onto the bottom wall 1902 with adhesive.

The cylindrical part 1810 is configured such that a portion of the cylindrical part in a thickness direction thereof is located radially inside the coil part 16A, and the remaining portion is located on an extension of the space.

The bulged parts 1812 are formed so as to bulge in a direction parallel to the radial outward direction of the coil 16 from three spots at regular intervals in the peripheral direction on an outer peripheral face of the magnet 18.

These bulged parts 1812 are respectively accommodated in cutouts 1920 that are formed from flange part 1906 to the side wall 1904.

In the present embodiment, the bulged parts 1812 constitute the weight increasing part W, and the same effects as the first embodiment is exhibited.

Ninth Embodiment

Next, a ninth embodiment will be described.

In the ninth embodiment, the housing 14, the yoke 19, and the spring 20 are configured separately.

Figure 29:
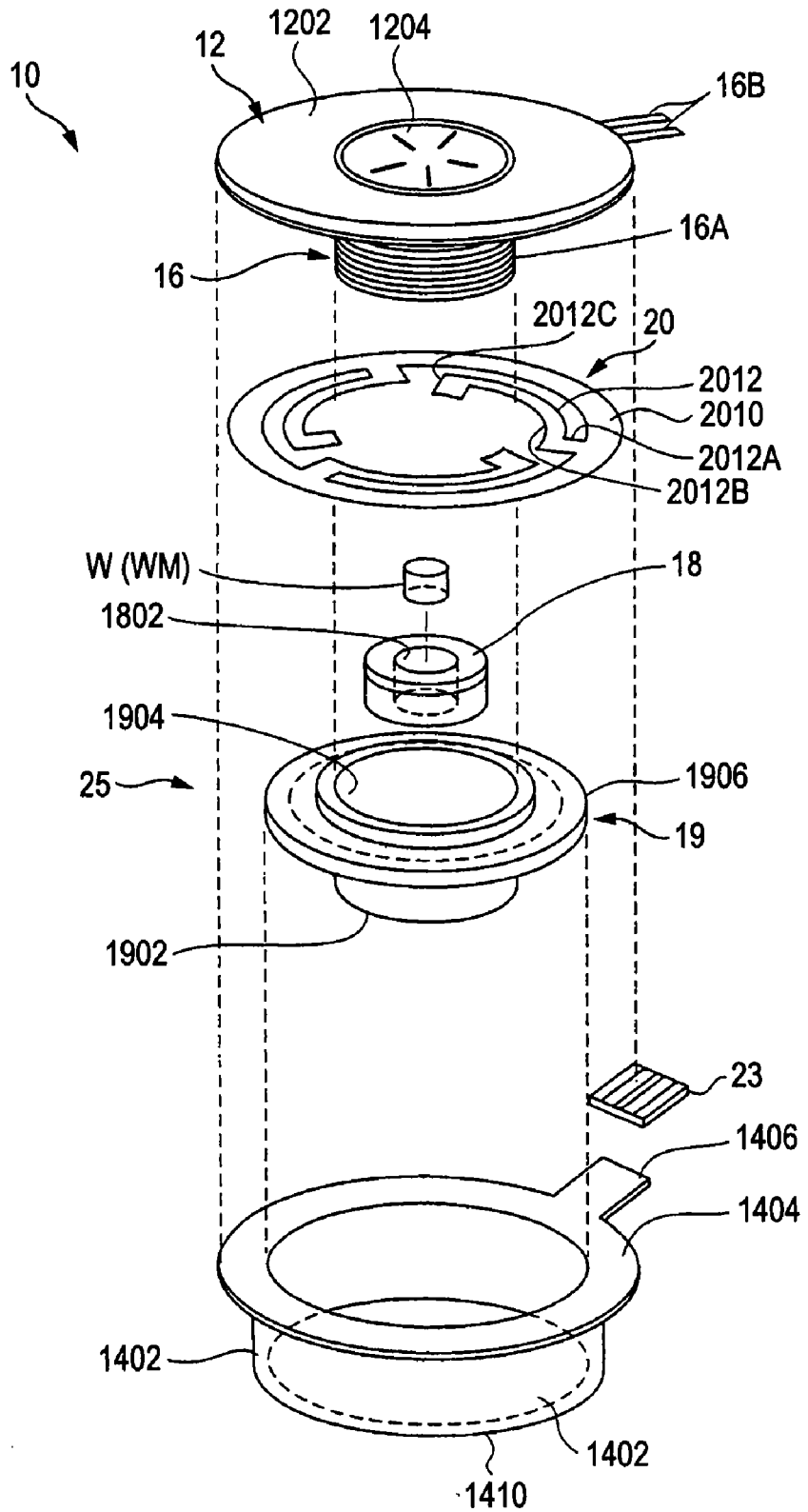
FIG. 29 is an exploded perspective view showing the configuration of an actuator 10 according to a ninth embodiment.
Figure 30:
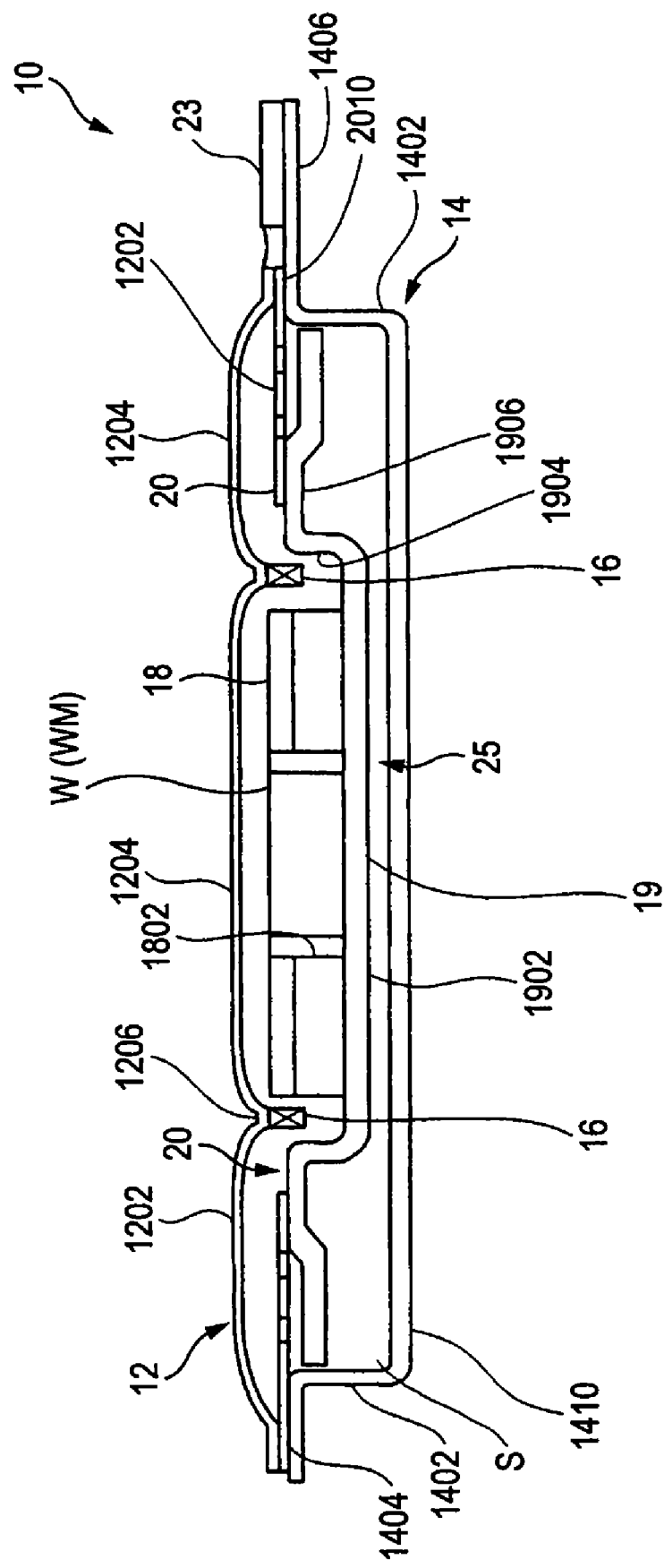
FIG. 30 is a sectional view of the actuator 10.

FIG. 29 is an exploded perspective view showing the configuration of the actuator 10 according to the ninth embodiment, and FIG. 30 is a sectional view of the actuator 10.

The housing 14 has a cylindrical wall part 1402, a flange part 1404 that extends radially outwardly from one axial end of the cylindrical wall part 1402, a bottom wall part 1410 that closes the other axial end of the cylindrical wall part 1402.

In the present embodiment, the housing 14 is formed of a magnetic material, such as stainless steel.

The spring 20 includes an outside annular plate part 2010 having a diameter that is slightly smaller than the outer diameter of the flange part 1404, and a plurality of arm parts 2012 that are provided so as to protrude inwardly from a plurality of spots at intervals in a peripheral direction of the outside annular plate part 2010.

Moreover, in the present embodiment, the outside annular plate part 2010 and the arm parts 2012 extends in the same plane orthogonal to the axis of the outside annular plate part 2010.

Each of the arm parts 2012 includes a first rectilinear section 2012A that extends radially inwardly from the outside annular plate part 2010, a curvilinear section 2012B that extends along an inner periphery of the outside annular plate part 2010 from a tip of the first rectilinear section 2012A, and a second rectilinear section 2012C that extends radially inwardly of the outside annular plate part 2010 from a tip of the curvilinear section 2012B.

The housing 14 and the spring 20 are positioned such that the axes thereof coincide with each other, and an upper face of the flange part 1404 of the housing 14 and a lower face of the outside annular plate part 2010 of the spring 20 are bonded together with adhesive.

Moreover, an upper face of the outside annular plate part 2010 of the spring 20 is bonded to an outer edge of the diaphragm 12 with adhesive. Similar to the first embodiment, an accommodating space S the axis of which extends in the thickness direction in the middle of the diaphragm 12 is formed inside the diaphragm 12 and the housing 14.

Similar to the first embodiment, the magnet 18 is formed in the shape of an annular plate, and one end of the magnet in a thickness direction thereof is magnetized to either an N pole or an S pole, and the other end of the magnet is magnetized to the other N pole or S pole.

An accommodating hole 1802 is formed in the middle of the magnet 18. In the present embodiment, the accommodating hole 1802 passes through the magnet in the thickness direction thereof.

Similar to the first embodiment, the weight increasing part W is composed of a weight increasing member WM that is formed of a material having a greater specific gravity than the magnet 18.

The weight increasing member WM is formed in a cylindrical shape having such a diameter that it can be accommodated in the accommodating hole 1802. In the present embodiment, the thickness of the weight increasing member WM and the thickness of the magnet 18 are formed to be almost the same dimension.

The yoke 19 has a bottom wall 1902 that is formed to have a greater diameter than the outer diameter of the magnet 18, a tubular side wall 1904 that is erected from an outer edge of the bottom wall 1902 and has a slightly greater inner diameter than the outer diameter of the coil part 16A of the coil 16, and a flange part 1906 that is bent radially outwardly from a tip of the side wall 1904.

Similar to the first embodiment, the yoke 19 is formed of a magnetic material that efficiently leads lines of magnetic force from the magnet 18. As the magnetic material, for example, Permalloy that is an alloy of nickel (Ni) and iron (Fe) can be used.

In a state where the yoke 19 is positioned such that the center of the bottom wall 1902 coincides with the axis of the outside annular plate part 2010 by abutting the upper face of the flange part 1906 against the lower face of the tip of the second rectilinear section 2012C of the spring 20 and, the upper face of the flange part 1906 is fixedly bonded to the lower face of the tip of the second rectilinear section 2012C with adhesive.

The magnet 18 is positioned such that the axis of the magnet coincides with the axis of the bottom wall 1902, and bonded to the bottom wall 1902 with adhesive.

The weight increasing member WM is accommodated in the through hole 1802, and the weight increasing member is positioned such that the axis of the weight increasing member WM coincides with the axis of the bottom wall 1902.

Accordingly, the magnet 18, the weight increasing member WM, and the yoke 19 are supported by the spring 20 such that the axes thereof coincide with the axis of the housing 14.

In the present embodiment, the magnet 18, the weight increasing member WM, and the yoke 19 constitute a movable body 25 as set forth in the claims, and the movable body 25 is supported so as to be movable in the axial direction within the accommodating space S by the spring 20.

Moreover, as shown in FIG. 30, an end of the coil 16 away from the diaphragm 12 is located outside the magnet 18 and inside the tubular side wall 1904. That is, a portion of the coil part 16A of the coil 16 is located in an annular space that is formed between an outer periphery of the magnet 18 and an inner periphery of the side wall 1904 of the yoke 19. Accordingly, the bottom wall 1902 and side wall 1904 of the yoke 19 constitute a magnetic circuit that leads lines of magnetic force from the magnet 18 to the coil 16, thereby improving a magnetic mutual action that occurs between the magnet 18 and the coil 16.

Moreover, in the present embodiment, lines of magnetic force that are directed towards the outside of the housing 14 through a space between the arm parts 2012 from the coil 16 are shielded by the bottom wall part 1410 of the housing 14. Therefore, as compared with the first embodiment, the cover 21 becomes unnecessary, which is advantageous to reduce the cost of parts.

Even in such a ninth embodiment, similar to the first embodiment, since the vibration generated by the movable body 25 can be further increased by increasing the weight of the movable body 25 using the weight increasing part W that is provided in the movable body 25, it is advantageous to miniaturize the actuator 10 and ensure the magnitude of vibration to be generated.

Moreover, in the ninth embodiment, since the housing 14, the yoke 19, and the spring 20 are configured separately, it is advantageous to ensure the degree of freedom in the design of the housing 14, the yoke 19, and the spring 20.

Tenth Embodiment

In addition, the first to eighth embodiments have been described about the case where the housing 14 and the spring 20 are formed integrally. If the housing 14 and the spring 20 are formed integrally in this way, it is advantageous to realize miniaturization and cost reduction.

Hereinafter, tenth and eleventh embodiments in which the housing 14 and the spring 20 are formed integrally will be described.

Figure 31:
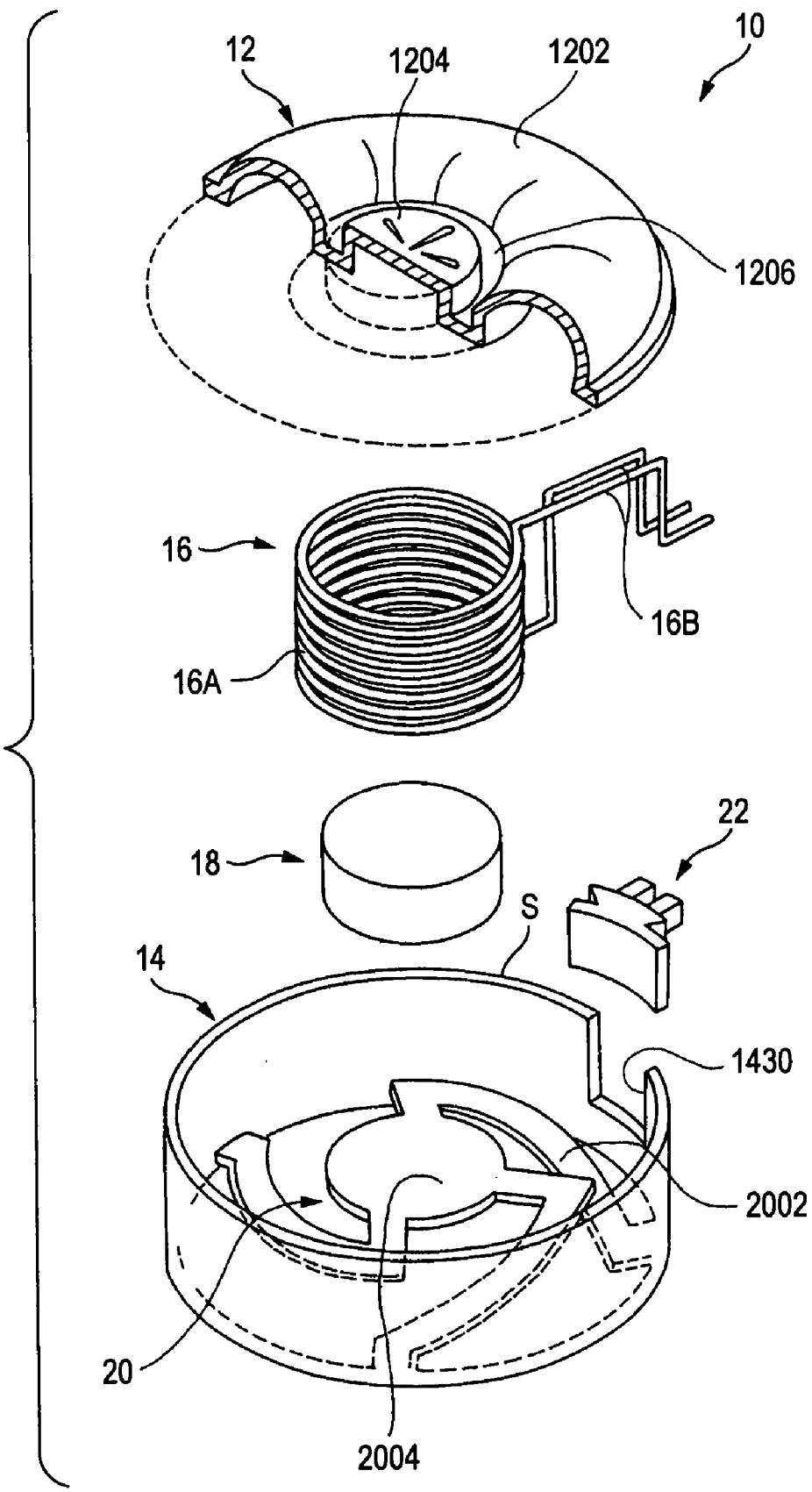
FIG. 31 is an exploded perspective view of the actuator 10 according to a tenth embodiment.
Figure 32:
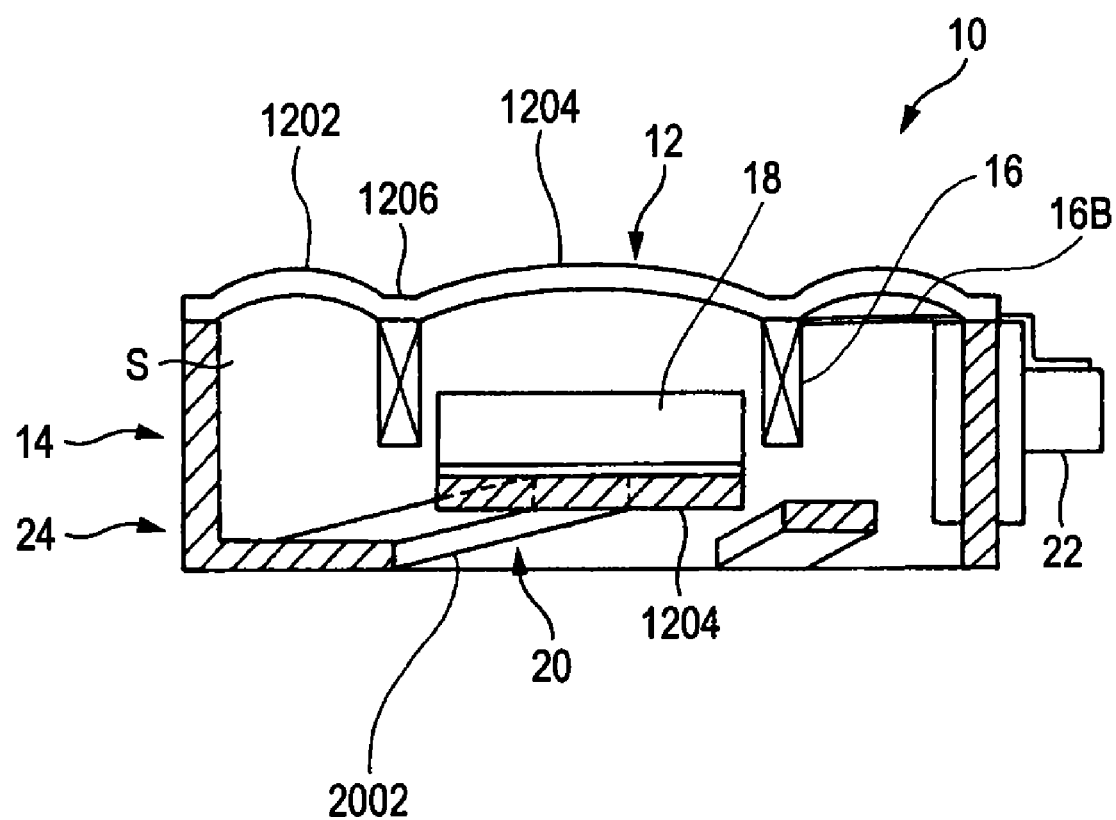
FIG. 32 is a sectional view of the actuator 10.
Figure 33A:
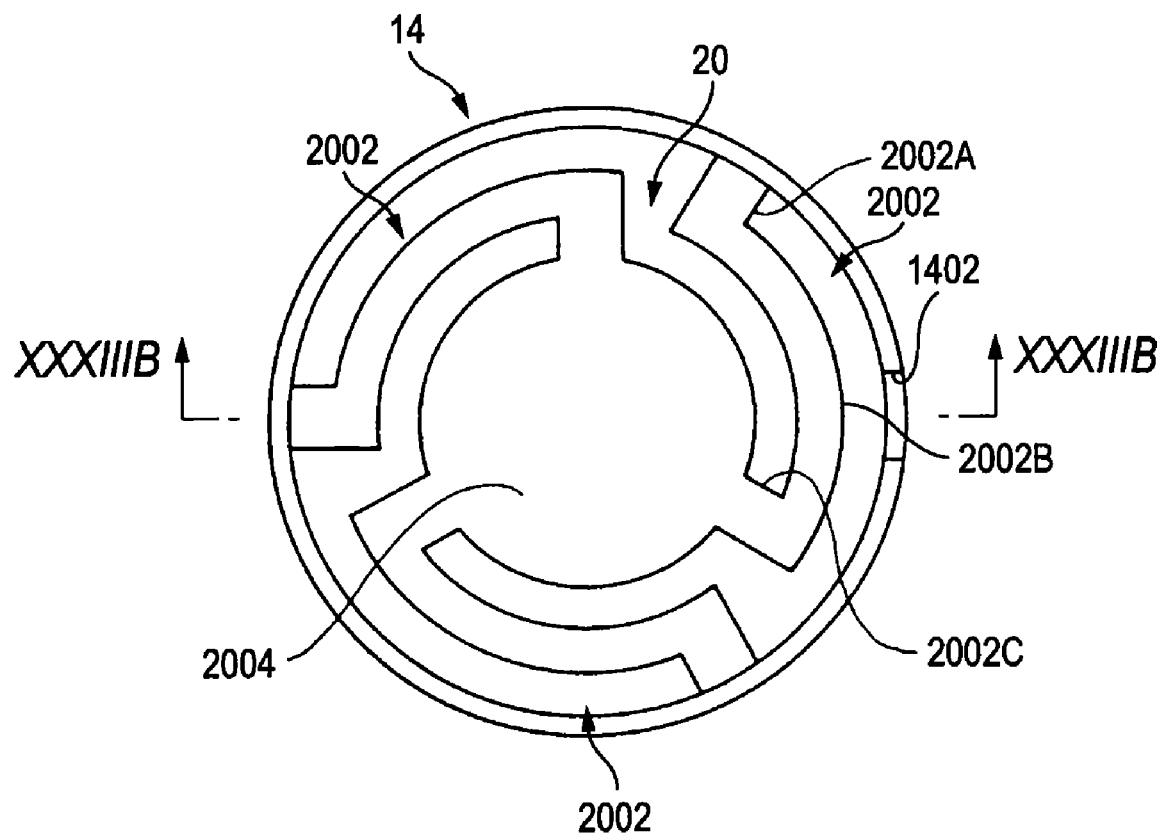
FIG. 33A is a plan view of the spring 20.
Figure 33B:
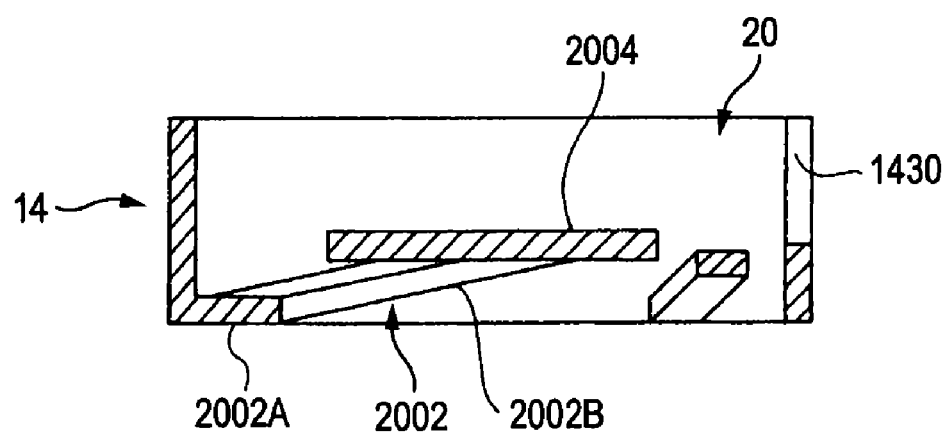
FIG. 33B is a sectional view taken along line XXXIIIB-XXXIIIB of FIG. 33A.

FIG. 31 is an exploded perspective view of the actuator 10, FIG. 32 is a sectional view of the actuator 10, FIG. 33A is a plan view of the spring 20, and FIG. 33B is a sectional view taken along line XXXIIIB-XXXIIIB of FIG. 33A.

As shown in FIG. 31 and FIG. 32, the actuator 10 includes a diaphragm (cone) 12, a housing 14, a coil 16, a magnet 18, and a spring 20.

The diaphragm 12 has an annular plate part 1202 that is formed to have an upwardly convex section, a circular middle plate part 1204 that is disposed in the middle of the annular plate part 1202, and an annular recessed part 1206 that connects an inner periphery of the annular plate part 1202 with an outer periphery of the middle plate part 1204.

In the present embodiment, the diaphragm 12 is made of synthetic resin, such as PC (polycarbonate) or PET (polyethylene terephthalate), and has a thickness of, for example, about 0.025 mm to 0.05 mm, and is configured to vibrate in a thickness direction thereof to generate sound.

The housing 14 is formed in the shape of a tube with almost the same dimension as the outer diameter of the diaphragm 12, and is attached to an outer edge of the annular plate part 1202 of the diaphragm 12 and has an accommodating space S formed therein in cooperation with the diaphragm 12.

One axial end of the housing 14 is fixed to an outer edge of the annular plate part 1202 with adhesive, and a spot in the vicinity of one end of the housing 14 is provided with a cutout 1430.

The coil 16 includes a coil part 16A and lead parts 16B.

The coil part 16A is wound around the axis passing through the diaphragm 12 in the thickness direction thereof, and attached to one face of the annular recessed part 1206 of the diaphragm 12 within the accommodating space S.

That is, the coil part 16A is formed with almost the same diameter as the annular recessed part 1206.

The lead parts 16B are formed such that winding that constitutes the coil part 16A extends radially outwardly of the coil part 16A from both ends of the coil part 16A. The lead parts 16B are led to the outside of the housing 14 by way of a holding member 22 that is engaged with the cutout 1430 and made of an insulating material.

In the present embodiment, the winding that constitutes the coil part 16A is, for example, a copper wire having a diameter of 40 μm. The holding member 22 is formed of synthetic resin, such as PC (polycarbonate), acrylic, or ABS (acrylonitrile butadiene styrene).

The magnet 18 is disposed inside the coil 16 within the accommodating space S.

The magnet 18 is formed in the shape of a disc, and one axial end of the magnet is magnetized to either an N pole or an S pole, and the other axial end of the magnet is magnetized to the other N pole or S pole.

In the present embodiment, the magnet 18 is formed of, for example, a neodymium-based sintered magnet.

In addition, the magnitude of the vibration generated by the magnet 18 can be increased by attaching a weight for increasing mass to the magnet 18. As the weight, a material having a great specific gravity is preferable. For example, tungsten can be employed.

The spring 20 supports the magnet 18 so that the magnet can be moved within the accommodating space S, and has elasticity in the axial direction.

The spring 20 is composed of a plurality of arm parts 2002 that extend to an inner periphery of the housing 14 from a plurality of spots at regular intervals in a peripheral direction of the other axial end of the housing 14, and a placing plate part 2004 that connects finger tips of the plurality of arm parts 2002 with one another.

The magnet 18 is fixedly placed in the placing plate part 2004 in a state where it is positioned such that the axis of the magnet 18 coincides with the axis of the coil 16.

Each of the arm parts 2002, as shown in FIG. 33A, includes a first rectilinear section 2002A that extends radially inwardly from the housing 14, a curvilinear section 2002B that extends towards the diaphragm 12 along an inner peripheral face of the housing 14 from a tip of the first rectilinear section 2002A, and a second rectilinear section 2002C that extends radially inwardly of the housing 14 from a tip of the curvilinear section 2002B and is connected to the placing plate part 2004.

Although the present embodiment has been described about the case that three arm parts 2002 are provided, the arm parts 2002 may be two or more or four or more. However, in a case where three arm parts 2002 are provided as in the present embodiment, it is advantageous to ensure the length of the curvilinear section 2002B and to stably support the placing plate part 2004.

The housing 14 and the spring 20 are formed of a magnetic material that efficiently leads lines of magnetic force from the magnet 18, and they are integrally formed by performing pressing, such as bending, drawing, or punching, on a stainless plate having a thickness of about 0.2 mm to 1.0 mm.

In addition, the magnet 18, the spring 20, and the housing 14 constitute a magnetic circuit 24 that leads lines of magnetic force from the magnet 18 to the coil 16.

Next, the operational effects of the actuator 10 will be described.

When a predetermined electrical signal (current signal) is supplied to the lead parts 16B of the coil 16 from an external device, a magnetic field is generated from the coil 16. The magnetic interaction of the magnetic field generated by the coil 16 and the magnetic field generated by the magnet 18 causes both the coil 16 and the magnet 18 to relatively vibrate in the axial direction.

The vibration of the coil 16 in the axial direction causes the diaphragm 12 to vibrate in the thickness direction thereof, thereby generating sound.

At the same time, the vibration of the magnet 18 in the axial direction is transmitted to the housing 14, whereby the housing 14 vibrates.

The vibrational frequencies of the diaphragm 12 and the magnet 18 are determined by the frequency of an electrical signal to be supplied to the coil 16.

Accordingly, according to the actuator 10 of the present embodiment, since the housing 14 and the spring 20 are formed integrally, and the magnet 18, the spring 20, and the housing 14 constitute the magnetic circuit 24 that leads lines of magnetic force from the magnet 18 to the coil 16, as compared with the related art, a plurality of yoke members become unnecessary. As a result, it is advantageous to reduce the number of parts, thereby simplifying assembling, and realizing cost reduction and miniaturization.

Moreover, in an actuator in the related art, for example, a spring is incorporated into a case made of synthetic resin by insert molding. Therefore, the actuator requires much manufacturing cost. In contrast, in the actuator 10 according to the present embodiment, it is advantageous to realize the cost reduction because such insert molding is unnecessary.

Moreover, in the present embodiment, the coil 16 and the magnet 18 are accommodated in the accommodating space S of the housing 14. Therefore, the coil 16 can lead lines of magnetic force much more by preventing leakage of magnetic fluxes of the magnet 18. Accordingly, it is advantageous to more strongly vibrate the coil 16 and the magnet 18.

Next, a case where the actuator 10 according to an embodiment of the invention is applied to a touch panel display device provided in an electronic apparatus will be described.

Figure 34:
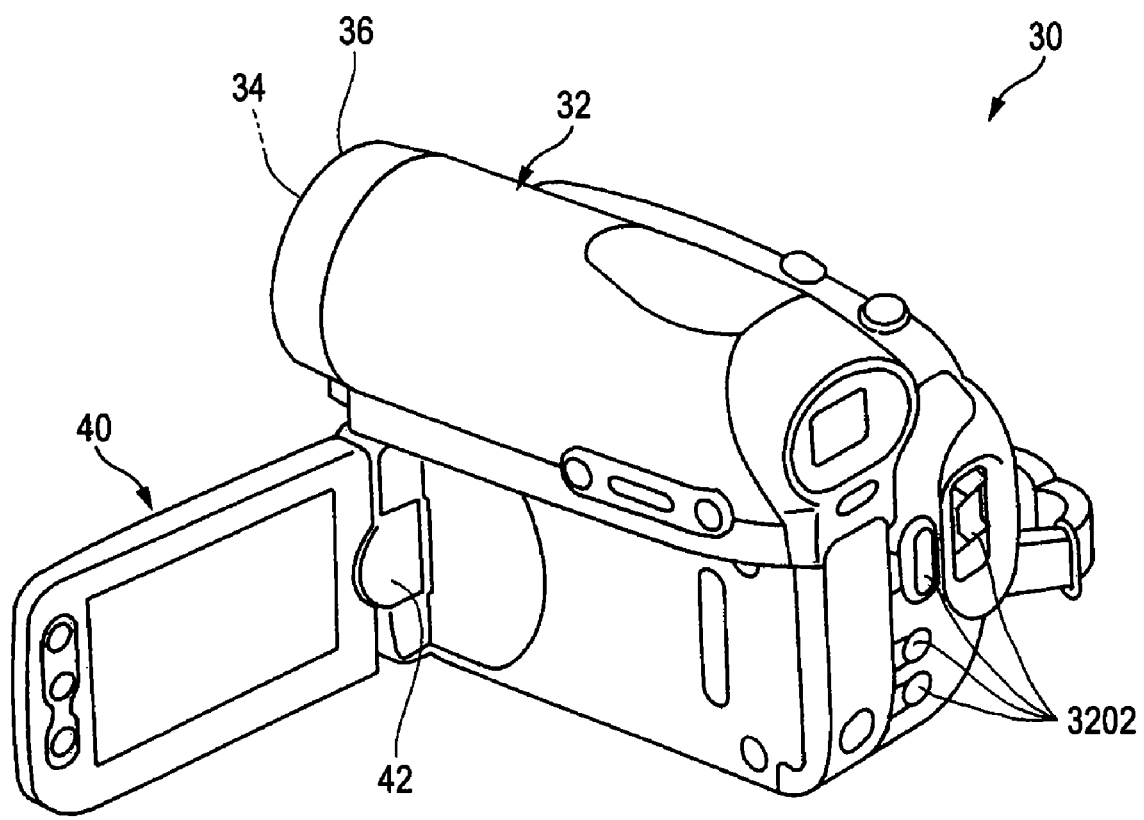
FIG. 34 is a perspective view of an electronic apparatus according to the present embodiment.

FIG. 34 is a perspective view of an electronic apparatus according to the present embodiment.

In the present embodiment, the electronic apparatus is a video camera 30.

The video camera 30 has a case 32 that constitutes an outer package. A front upper part of the case 32 is provided with a lens barrel 36 into which an image pickup optical system 34 is incorporated. An image pickup device (not shown) that picks up an object image that has been led by the image pickup optical system 34 is incorporated into a rear end of the lens barrel 36.

Various operation switches 3202, such as a power switch, an image pickup start/stop switch and a zoom switch, are provided on a rear face, a top face, and a side face of the case 32.

On the left side face of the case 32, a touch panel display device 40 for displaying an image that is picked up by the image pickup device is connected to the case 32 so as to be openable/closable about a hinge 42, and the invention is applied to the touch panel display device 40.

Figure 35:
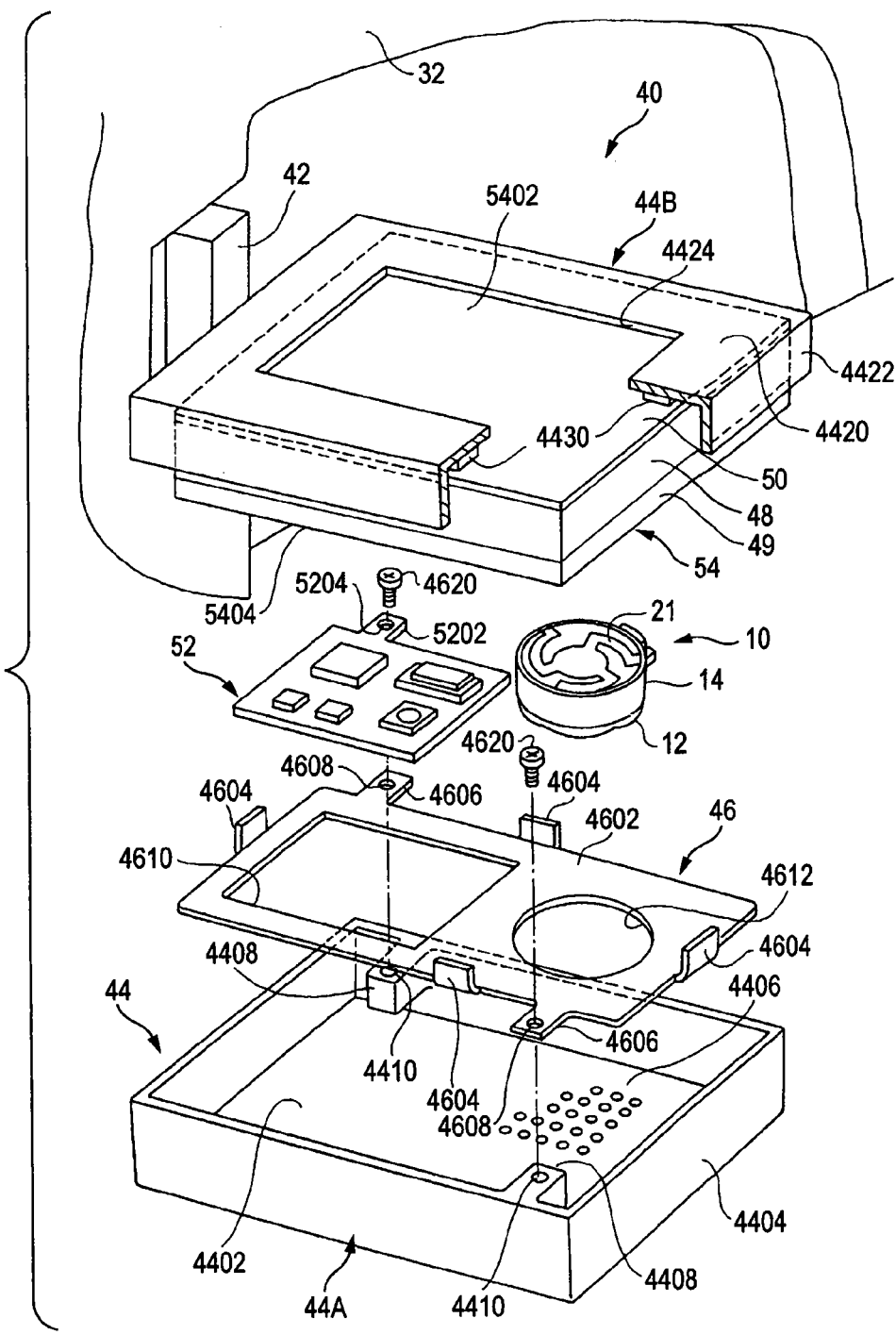
FIG. 35 is an exploded perspective view of a touch panel display device 40 using the actuator 10 according to the tenth embodiment.
Figure 36:
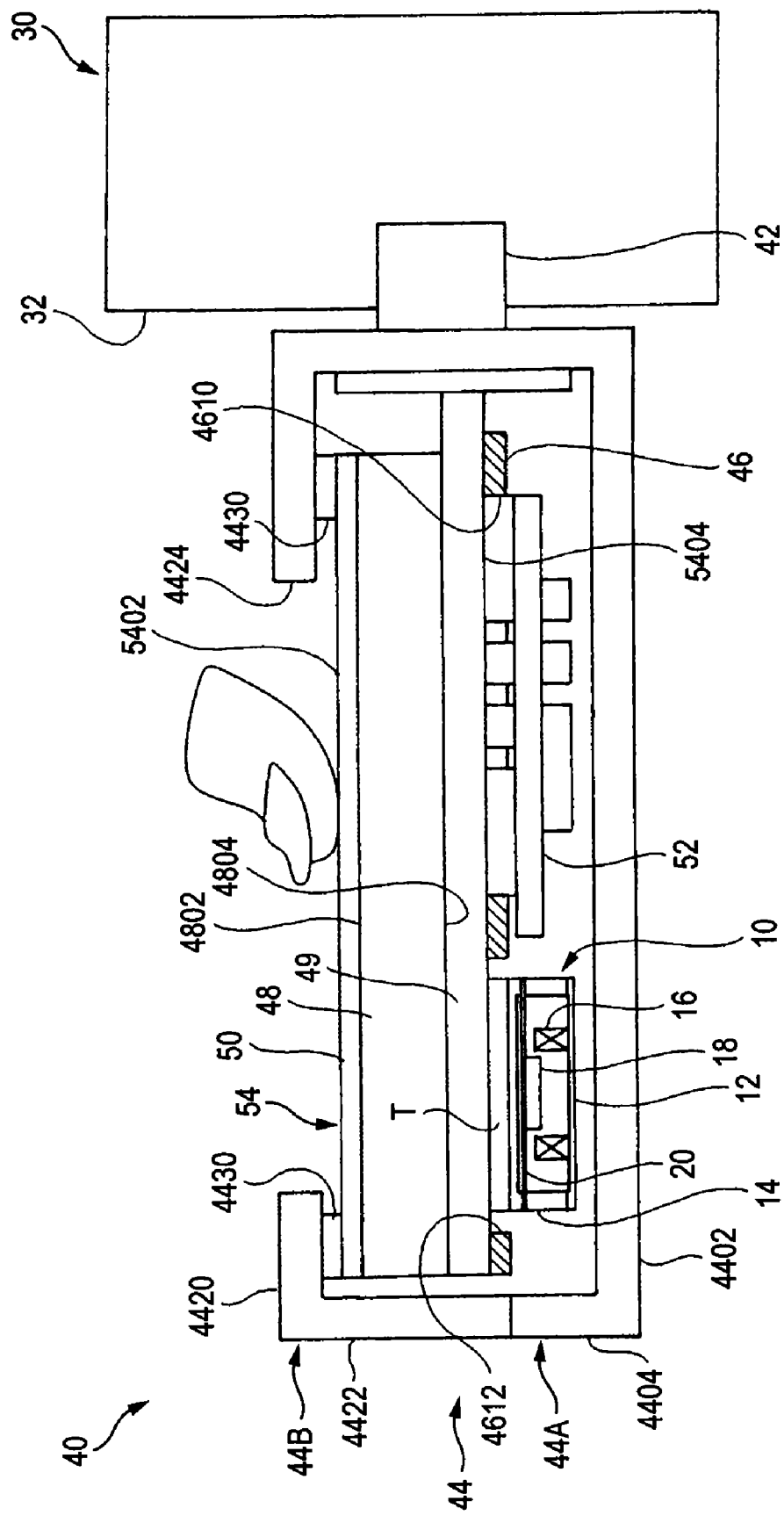
FIG. 36 is a sectional view of the touch panel display device 40.

FIG. 35 is an exploded perspective view of the touch panel display device 40 using the actuator 10 according to the tenth embodiment, and FIG. 36 is a sectional view of the touch panel display device 40.

The touch panel display device 40 has a case 44 (equivalent to a chassis in the claims), a frame 46, a display panel 48, a back light unit 49, a touch panel 50, a circuit board 52, the actuator 10, etc.

The case 44 has a first case 44A that is formed in the shape of a rectangular plate, and a second case 44B that is formed in the shape of a rectangular frame, and combined with the first case 44A. By combining the first case 44A and the second case 44B, the frame 46, the display panel 48, the touch panel 50, the circuit board 52, and the actuator 10 are accommodated and held within the case 44.

The first case 44A has an oblong outer wall 4402, and four side walls 4404 that are erected from four sides of the outer wall 4402.

A plurality of sound releasing holes 4406 are formed in a spot in the vicinity of one short side of the outer wall 4402 so as to pass therethrough.

Mounting parts 4408 are respectively provided inside two long side walls 4404 so as to protrude therefrom, and a screw hole 4410 is formed in a face of each mounting part 4408 opposite to the outer wall 4402.

The second case 44B has an inner wall 4420 (equivalent to a frame-like front face of a chassis in the claims) that is formed in the shape of an oblong frame having an outline that is one size larger than the outer wall 4402 of the first case 44A, and four side walls 4422 that are erected from four sides of the inner wall 4420. An oblong opening 4424 is formed in the inner wall 4420.

A cushioning member 4430 that has a constant thickness along the opening 4424 and made of an elastic material, such as sponge or rubber, is bonded to an inner face of the inner wall 4420.

One of the short side walls 4422 is connected to the hinge 42.

An engaging claw and an engaging groove (not shown) are formed in the mutually facing side walls 4422 and 4404, respectively, in a state where the four side walls 4404 of the first case 44A are accommodated inside the four side walls 4422 of the second case 44B. When the engaging claw and the engaging groove are engaged with each other, the first case 44A and the second case 44B are connected to each other.

The frame 46 is made of sheet metal, and has an oblong plate-shaped main plate part 4602 that is formed to have such a size that it can be accommodated inside the four side walls 4404 of the first case 44A.

A locking piece 4604 is erected from a substantially middle spot of each of four edges of the main plate part 4602.

Mounting pieces 4606 are respectively provided in the spots corresponding to the mounting parts 4408 of the first case 44A in two long sides of the main plate part 4602 so as to protrude therefrom. An insertion through-hole 4608 corresponding to the screw hole 4410 is formed in each mounting piece 4606.

Moreover, a rectangular circuit board accommodating opening 4610 is formed in the main plate part 4602 to accommodate the circuit board 52. Moreover, a circular actuator accommodating opening 4612 is formed in the main plate part 4602 in parallel with the circuit board accommodating opening 4610 to accommodate the actuator 10.

The circuit board 52 takes a rectangular plate shape that is one size smaller than the circuit board accommodating opening 4610, and has electronic components mounted on both faces thereof.

A mounting piece 5202 is formed on one side of the circuit board 52 so as to protrude therefrom, and a screw insertion through-hole 5204 is formed in the mounting piece 5202.

The display panel 48 is composed of, for example, a liquid crystal display panel, and is formed in the shape of an oblong plate having such a size that it can be accommodated inside the second case 44B.

In the display panel 48, one surface thereof is formed as a display surface 4802, and the other surface 4804 thereof is integrally combined with the back light unit 49 that illuminates the display panel 48 from the other surface 4804.

The touch panel 50 is formed in the shape of a sheet, and bonded to the display surface 4802 in a state where it covers the whole display surface 4802, whereby the touch panel 50 and the display panel 48 are combined integrally. That is, the touch panel 50, the display panel 48, and the back light unit 49 constitute a panel unit 54.

Accordingly, the surface of the panel unit 54 forms a panel surface 5402 that is brought into contact with a finger tip of a user who tries to operate the touch panel display device 40.

The touch panel display device 40 is assembled as follows.

First, the frame 46 is placed on the first case 44A, and the circuit board 52 is located in the circuit board accommodating opening 4610 of the frame 46.

In that state, the screw 4620 is inserted through the screw insertion through-hole 5204 of the circuit board 52 and the screw insertion through-hole 4608 of the frame and is screwed into the screw hole 4410, and the other screw 4620 is inserted through the screw insertion through-hole 4608 of the frame and is screwed into the screw hole 4410.

This allows the frame 46 and the circuit board 52 to be assembled to the first case 44A.

Next, an end of the actuator 10 on the side of the spring 20 of the housing 14 is bonded and attached to a predetermined spot of a rear surface 5404 (a surface of the panel unit opposite to the panel surface) of the panel unit 54 with a double-sided adhesive tape T.

Next, the rear surface of the panel unit 54 to which the actuator 10 is attached is placed on the main plate part 4602 of the frame 46, the actuator 10 is caused to be accommodated in the actuator accommodating opening 4612, and the four locking pieces 4604 of the frame 46 are abutted against the four side faces of the panel unit 54.

In that state, the second case 44B is inserted into the first case 44A, thereby combining the second case 44B with the first case 44A.

In this state, the panel unit 54 is located between the first case 44A and the second case 44B.

Specifically, when each side face of the panel unit 54 is abutted against each locking piece 4604 of the frame 46, the panel unit 54 is supported so as to be immovable in a direction orthogonal to the thickness direction thereof. Moreover, when the rear surface of the panel unit 54 is abutted on the main plate part 4602, and the panel surface of the panel unit 54 is brought into elastic contact with the cushioning member 4430, the panel unit 54 will be sandwiched between the inner wall 4420 and the main plate part 4602 of the frame 46 in a state where the cushioning member 4430 is deformed elastically.

Next, the configuration of a control system of the video camera 30 will be described.

Figure 37:
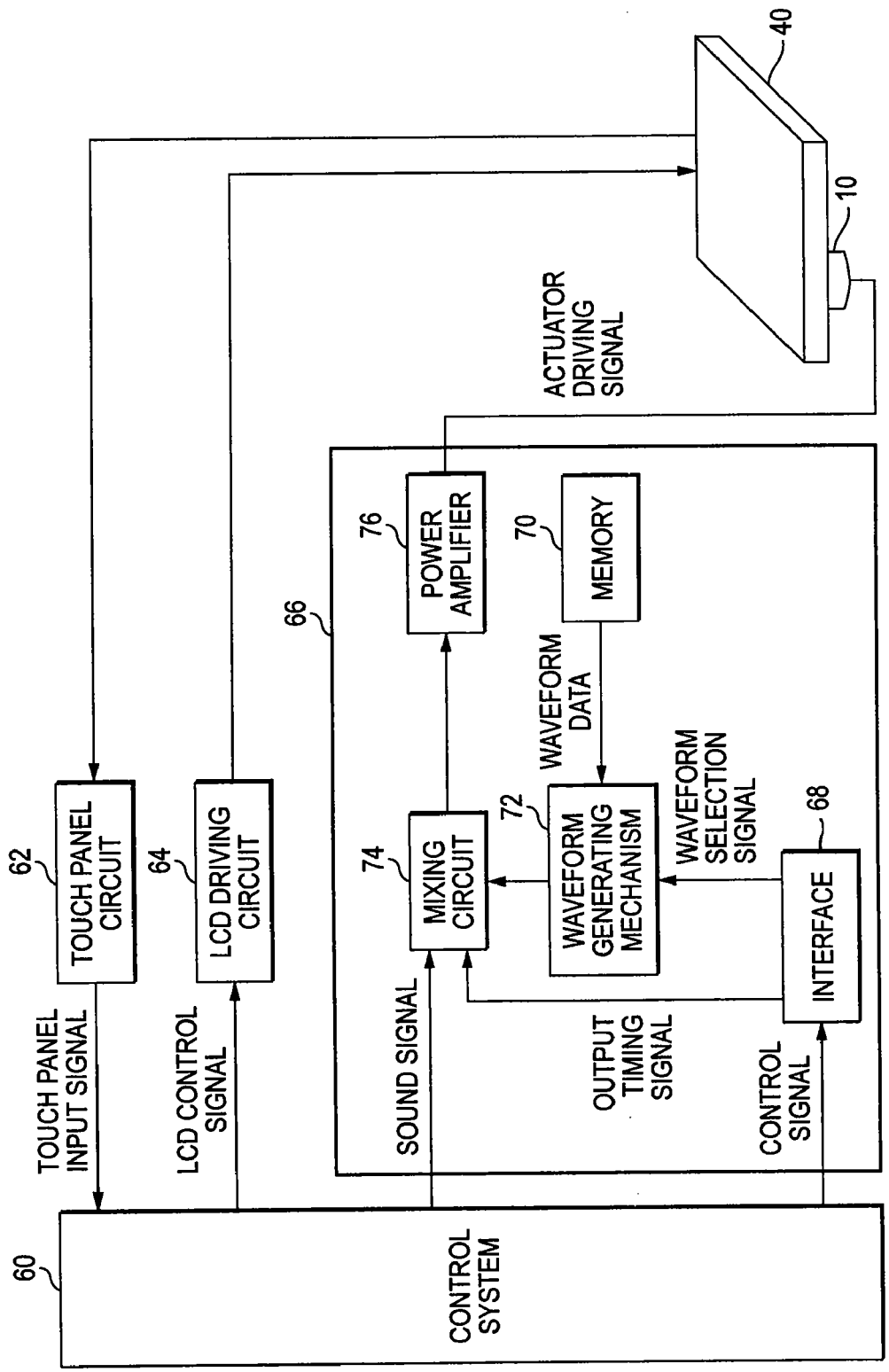
FIG. 37 is a block diagram showing the configuration of a control system of a video camera 30.

FIG. 37 is a block diagram showing the configuration of the control system of the video camera 30.

In FIG. 37, reference numeral 60 denotes a control system of the video camera 30 equipped with the touch panel display device 40. Control mechanisms and electronic circuits of the touch panel display device 40 are under the control of this control system 60.

The control mechanisms and electronic circuits of the touch panel display device 40 include a touch panel circuit 62 that is connected to the touch panel 50 of the panel unit 54, an LCD driving circuit 64 that is connected to the display panel 48 of the panel unit 54, and an actuator driving control mechanism 66 that controls driving of the actuator 10.

The touch panel circuit 62, which is a circuit annexed to a general touch panel, processes a signal obtained from a touch panel to generate a signal indicative of a position where the panel surface 5402 is touched by a user's finger.

The LCD driving circuit 64, which is a circuit annexed to a general liquid crystal touch panel, drives the display panel 48 according to an LCD control signal received from the control system 60 to perform visual display.

The actuator driving control mechanism 66 is composed of a one-chip computer including a central processing unit and a memory, and an electronic circuit, and includes an interface 68 to receive a control signal from the control system 60. The control signal received from the control system 60 includes an output timing signal and a waveform selection signal.

The actuator driving control mechanism 66 includes a memory 70. Data (waveform data) that is required for generation of a waveform corresponding to each of a plurality of waveforms is stored in the memory 70. Moreover, the actuator driving control mechanism 66 includes a waveform generating mechanism 72, a mixing circuit 74, and a power amplifier 76.

The waveform generating mechanism 72, which is a mechanism constituted by software, reads out data corresponding to a waveform designated by a waveform selection signal from the memory 70 and generates a waveform according to the read-out waveform data.

The mixing circuit 74 sends out an output signal having a waveform generated by the waveform generating mechanism 72 for a period designated by an output timing signal and also sends out a sound signal from the control system 60 as an output signal. Moreover, the mixing circuit 74 is adapted not only to send out the output signal and the sound signal separately, but to send out a mixed signal of the output signal and the sound signal as one output signal.

Moreover, the power amplifier 76 amplifies an output signal from the mixing circuit 74 to supply the amplified output signal to the actuator 10 as an actuator driving signal. Accordingly, the actuator driving control mechanism 66 has a function as a means that causes the actuator driving signal to be overlapped with a sound signal.

A waveform generated in the waveform generating mechanism 72 is a vibration waveform. Some amplitudes, periods, and waveforms are constant, but other amplitudes, periods, and waveforms may vary. The waveform data stored in the memory 70 also includes data on amplitudes and periods.

Also, a piece of waveform data on a waveform designated by a waveform selection signal is read out among waveform data corresponding to a plurality of waveforms stored in the memory 70, and an actuator driving signal having the waveform is supplied to the actuator 10.

This causes the actuator 10 to vibrate. This vibration is transmitted to the panel unit 54 via the double-sided adhesive tape T from the housing 14, whereby the panel unit 54 will vibrate according to the waveform of the actuator driving signal.

Also, the vibration of the panel unit 54 generates a sense of touch corresponding to the waveform of the actuator driving signal in a user's finger tip that touches the panel surface 5402 of the panel unit 54. Accordingly, the actuator driving control mechanism 66 drives the panel unit 54 to vibrate the panel unit in a vibration pattern selected among a plurality of predetermined vibration patterns. Moreover, the plurality of predetermined vibration patterns generate senses of touch different from one another, in a user's finger tip that touches the panel surface 5402 of the panel unit 54.

Moreover, when the control system 60 sends out a sound signal to the actuator driving control mechanism 66, the sound signal is also supplied to the actuator 10 while being overlapped with the actuator driving signal.

It is noted that the waveform generated by the waveform generating mechanism 72 and the sound signal overlapped with the waveform have different frequency bands.

Since the waveform generated by the waveform generating mechanism 72 is intended to generate a sense of touch in a user's finger tip, the vibration frequency is set to about 60 Hz to 200 Hz for the purpose of being subtly sensed by the user's finger tip.

On the other hand, the frequency of the sound signal is approximately 800 Hz to 1600 Hz. Therefore, when the touch panel display device 40 emits sound, the sense of touch generated in the finger tip is not so great even if a user touches the panel surface of the panel unit 54 with his/her finger tip.

In addition, the circuits that supply a driving signal to the actuator 10 and generate a sound signal are not limited to the above-described configuration. For example, various signal generating circuits that are known in the related art can be employed.

Moreover, in the present embodiment, the actuator driving signal and the sound signal overlapped with the actuator driving signal constitute an electrical signal in the claims, and the touch panel circuit 62, the control system 60, and the actuator driving control mechanism 66 constitute a driving circuit in the claims.

Accordingly, according to the above-described touch panel display device 40 and the video camera 30, the actuator 10 can be used to generate a sense of touch in a user's finger tip that operates the touch panel display device 40, and miniaturization of the actuator 10 used for the touch panel display device 40 can be realized and great vibration can be generated by the actuator 10 as well as sound can be output by the actuator 10. Therefore, it is advantageous to realize miniaturization and cost reduction of the touch panel display device 40 and the video camera 30.

Moreover, since the touch panel display device 40 is miniaturized using the actuator 10, it also becomes considerably advantageous as an input/output device of a mobile electronic apparatus.

Eleventh Embodiment

Next, an eleventh embodiment will be described.

The eleventh embodiment is different from the tenth embodiment in which the housing 14 of the actuator 10 according to the tenth embodiment is provided with a mounting piece, and the eleventh embodiment is the same as the tenth embodiment in terms of other configuration.

Figure 38:
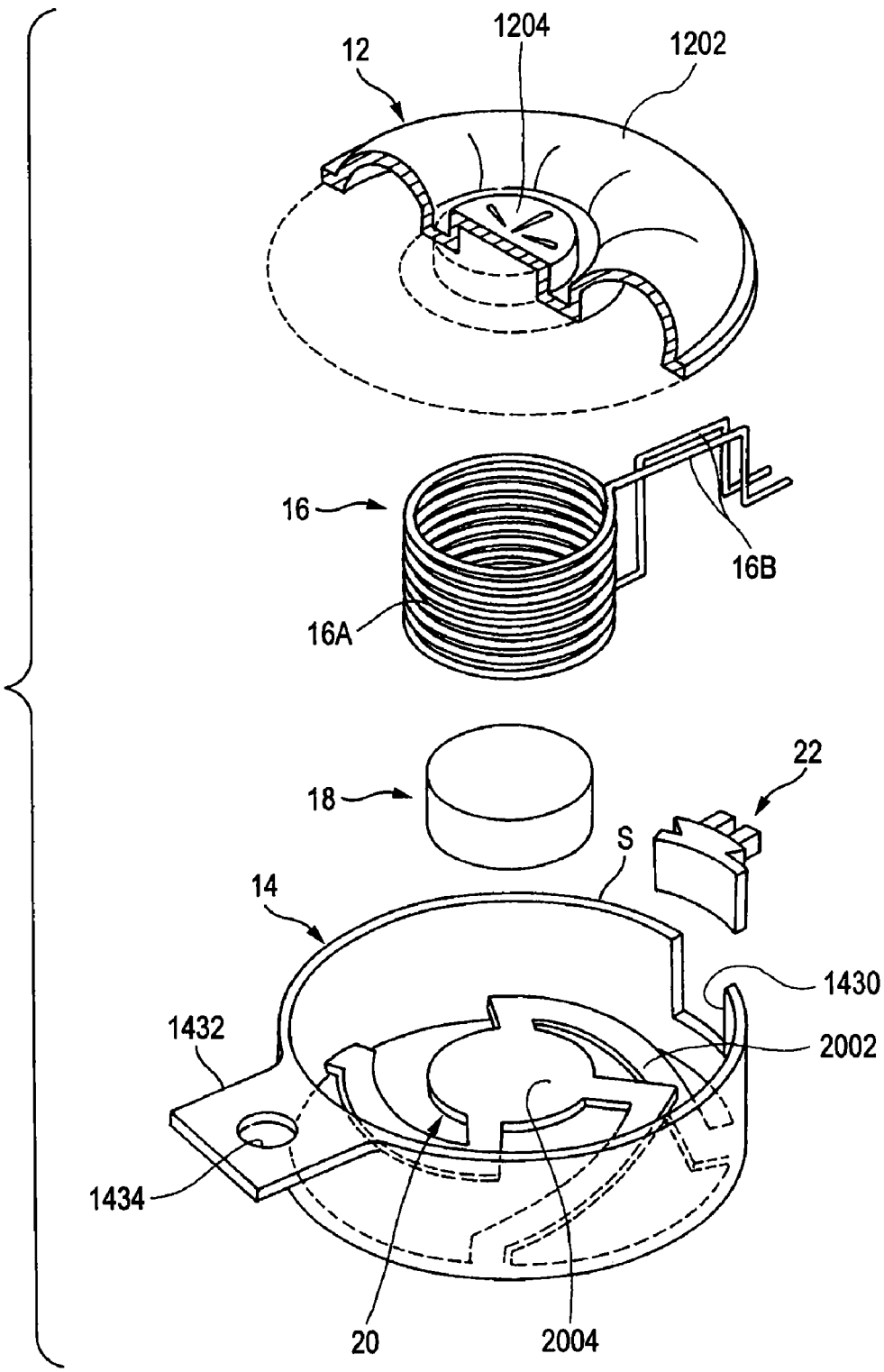
FIG. 38 is an exploded perspective view of an actuator 10 according to an eleventh embodiment.
Figure 39:
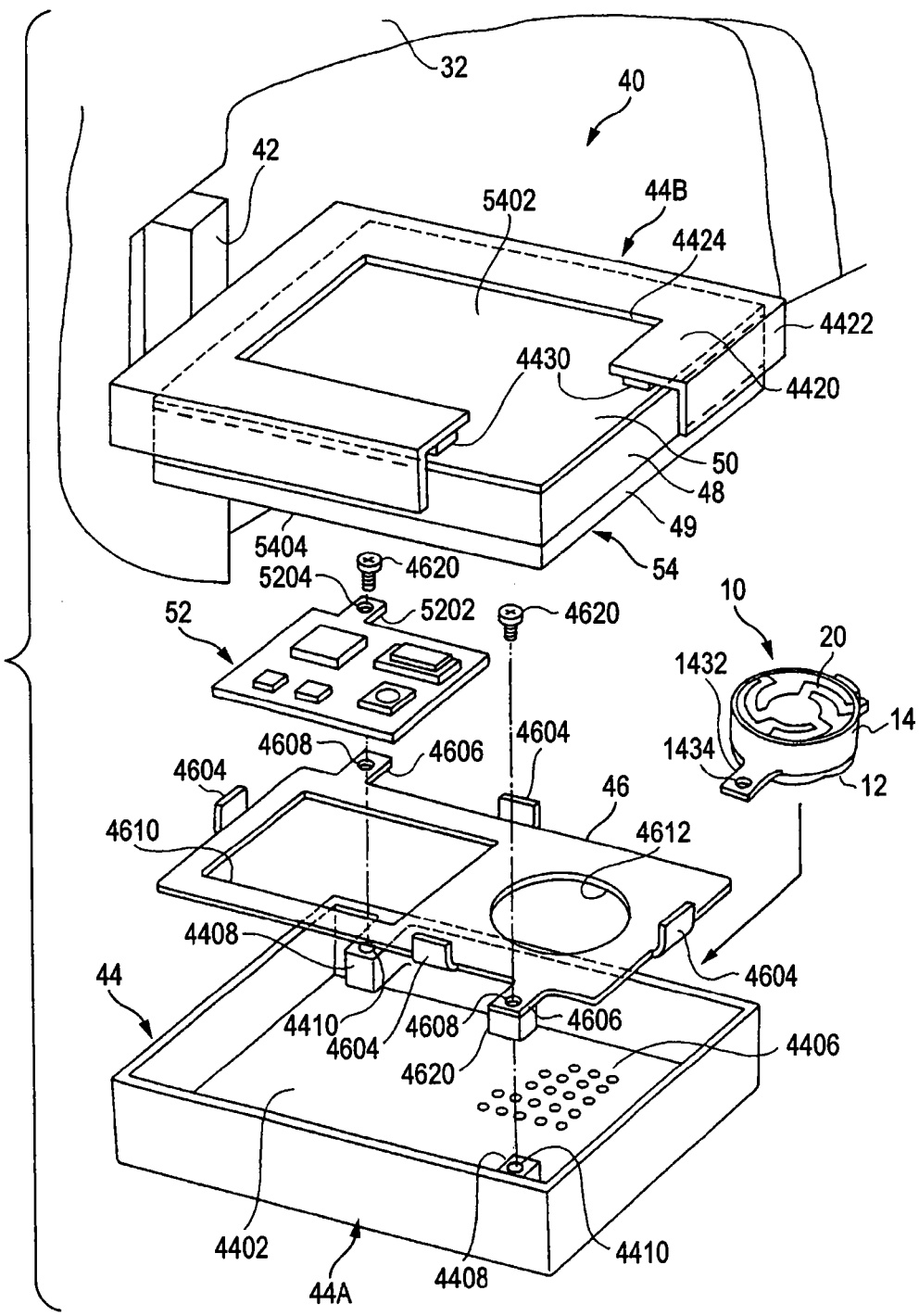
FIG. 39 is an exploded perspective view of a touch panel display device 40 using the actuator 10 according to the eleventh embodiment.

FIG. 38 is an exploded perspective view of an actuator 10 according to the eleventh embodiment, and FIG. 39 is an exploded perspective view of a touch panel display device 40 using the actuator 10 according to the eleventh embodiment.

In addition, the following embodiment will be described with the parts and members that are the same or similar to those of the tenth embodiment being denoted by the same reference numerals.

As shown in FIG. 38, similar to the tenth embodiment, the actuator 10 includes a diaphragm (cone) 12, a housing 14, a coil 16, a magnet 18, and a spring 20.

The housing 14, the spring 20, and a mounting piece 1432, similar to the tenth embodiment, are formed of a magnetic material that efficiently leads lines of magnetic force from the magnet 18, and they are integrally formed by performing bending or punching on a stainless plate having a thickness of about 0.2 mm to 1.0 mm.

The eleventh embodiment is different from the tenth embodiment in terms of the disposition structure of the actuator 10, and the eleventh embodiment is the same as the tenth embodiment in terms of other configuration.

Specifically, in the eleventh embodiment, an end of the housing 14 to be attached to the diaphragm 12 is provided with the mounting piece 1432 that protrudes radially outwardly of the housing 14, and the mounting piece 1432 is formed with a screw insertion through-hole 1434.

Also, when the actuator 10 is disposed, as shown in FIG. 39, the actuator 10 is disposed along with the frame 46 by mounting a spacer 4630 to a lower face of the mounting piece 4606 of the frame 46 in advance, then locating the actuator 10 below the frame 46, then inserting the housing 14 through the actuator accommodating opening 4612, then abutting an upper face of the mounting piece 1432 against a lower face of the spacer 4630, and then fastening the mounting piece 1432 along with the frame 46 to the mounting part 4408 with screw 4620. Moreover specifically, the panel unit 54 is disposed by sandwiching the touch panel 50 between the inner wall 4420 (equivalent to a frame-like front face of a chassis in the claims) and one face of the frame 46 in a thickness direction thereof such that the touch panel faces the inner wall 4420, and by attaching the actuator 10 to the other face of the frame 46 in the thickness direction thereof.

In the eleventh embodiment, the actuator 10 is disposed apart from the panel unit 54. Accordingly, the rear surface 5404 of the touch panel display device 40 is not in contact with the housing 14 of the actuator 10.

In the eleventh embodiment, since the housing 14 of the actuator 10 is connected to the frame 46, vibration of the actuator 10 is easily transmitted to the panel unit 54 by way of the frame 46.

Specifically, when the panel surface 5402 of the touch panel display device 40 is pressed with a user's finger, the rear surface 5404 is pressed against the frame 46. Thus, vibration from the frame 46 is easily transmitted by the panel unit 54, and it is consequently advantageous in that a user subtly feels the vibration with his/her finger tip. As a result, the eleventh embodiment also exhibits the same effects as the tenth embodiment.

In addition, the tenth embodiment and the eleventh embodiment in which the housing 14 and the spring 20 are formed integrally are summarized below:

An actuator in which a housing and a spring are formed integrally includes: a diaphragm that vibrates in a thickness direction thereof to generate sound; a housing that is attached to an outer edge of the diaphragm to form an accommodating space therein in cooperation with the diaphragm; a coil that is wound around an axis passing through the diaphragm in the thickness direction thereof, and is attached to a face of the diaphragm within the accommodating space; a magnet that is disposed inside the coil within the accommodating space; and a spring that supports the magnet such that the magnet is movable in the axial direction within the accommodating space. Here, when an electrical signal is supplied to the coil, the coil and the magnet are caused to relatively move in the axial direction, thereby vibrating the diaphragm to generate sound, and the vibration of the magnet vibrate the housing. The spring and the housing are formed of a magnetic material, the magnet, the spring, and the housing constitute a magnetic circuit that leads lines of magnetic force from the magnet to the coil, and the spring and the housing are formed integrally.

Here, the housing is formed in the shape of a tube, one axial end of the housing is attached to an outer edge of the diaphragm, and the spring is provided at the other axial end of the housing.

Moreover, the spring has a placing plate part which the magnet is placed on and attached to in the middle of the accommodating space, and a plurality of arm parts that connect a plurality of spots spaced in a peripheral direction of the placing plate part with a plurality of spots spaced in a peripheral direction of the housing, and that can be elastically deformed in the axial direction.

Moreover, the arm parts extend along an inner peripheral face of the housing while they are displaced from the other axial end of the housing to the one axial end of the housing.

Moreover, there are three the arm parts.

Moreover, a touch panel display device in which a housing and a spring are formed integrally includes a panel unit having a display panel and a touch panel disposed on the display panel, a driving circuit that sends out an electrical signal when the touch panel is touched by a finger, and an actuator that vibrates the panel unit on the basis of the electrical signal of the driving circuit. The actuator includes: a diaphragm that vibrates in a thickness direction thereof to generate sound; a housing that is attached to an outer edge of the diaphragm to form an accommodating space therein in cooperation with the diaphragm; a coil that is wound around an axis passing through the diaphragm in the thickness direction thereof, and is attached to a face of the diaphragm within the accommodating space; a magnet that is disposed inside the coil within the accommodating space; and a spring that supports the magnet such that the magnet is movable in the axial direction within the accommodating space. Here, when an electrical signal is supplied to the coil, the coil and the magnet are caused to relatively move in the axial direction, thereby vibrating the diaphragm to generate sound, and the vibration of the magnet vibrate the panel unit via the housing. The spring and the housing are formed of a magnetic material, the magnet, the spring, and the housing constitute a magnetic circuit that leads lines of magnetic force from the magnet to the coil, and the spring and the housing are formed integrally.

Here, the housing is formed in the shape of a tube, a spot of the housing opposite to a spot thereof to which the diaphragm is attached in the axial direction of the housing is attached to a rear surface of the panel unit that is located opposite to the touch panel, whereby the actuator is disposed.

Moreover, the touch panel display device further includes a chassis. Here, a plate-shaped frame is disposed inside the chassis, the panel unit is sandwiched by a frame-like front face of the chassis and one face of the frame in a thickness direction thereof such that the touch panel faces the frame-like front face, and the actuator is attached to the other face of the frame in the thickness direction thereof and is disposed apart from the panel unit.

Moreover, an electronic apparatus in which a housing and a spring are formed integrally includes a panel unit having a display panel and a touch panel disposed on the display panel, a driving circuit that sends out an electrical signal when the touch panel is touched by a finger, and an actuator that vibrates the panel unit on the basis of the electrical signal of the driving circuit. The actuator includes: a diaphragm that vibrates in a thickness direction thereof to generate sound; a housing that is attached to an outer edge of the diaphragm to form an accommodating space therein in cooperation with the diaphragm; a coil that is wound around an axis passing through the diaphragm in the thickness direction thereof, and is attached to a face of the diaphragm within the accommodating space; a magnet that is disposed inside the coil within the accommodating space; and a spring that supports the magnet such that the magnet is movable in the axial direction within the accommodating space. Here, when an electrical signal is supplied to the coil, the coil and the magnet are caused to relatively move in the axial direction, thereby vibrating the diaphragm to generate sound, and the vibration of the magnet vibrate the panel unit via the housing. The spring and the housing are formed of a magnetic material, the magnet, the spring, and the housing constitute a magnetic circuit that leads lines of magnetic force from the magnet to the coil, and the spring and the housing are formed integrally.

In addition, although the above embodiments have been described about the case in which the touch panel display device 40 is provided in video camera 30, an electronic apparatus in which the touch panel display device 40 is provided is not limited to the video camera. For example, the electronic apparatus arbitrarily includes image pickup apparatuses, such as digital cameras, personal digital assistants (PDA), portable telephones, notebook computers, and the like.

It should be understood by those skilled in the art that various modifications, combinations, sub-combinations, and alternations may occur depending on design requirements and other factors insofar as they are within the scope of the appended claims or the equivalents thereof.

The invention is claimed as follows:

1. An actuator comprising:
   a diaphragm that vibrates to generate sound;
   a housing that is attached to an outer edge of the diaphragm to support the diaphragm;
   an accommodating space that is formed inside the diaphragm and the housing, and an axis of which extends in a thickness direction of the diaphragm in the middle of the diaphragm;
   a coil that is wound around the axis, is attached to a face of the diaphragm facing the accommodating space, and is disposed in the accommodating space;
   a movable body that is disposed in a radial inside space of the coil or on an extension of the radial inside space, within the accommodating space; and
   a spring that supports the movable body such that the movable body is movable in the axial direction within the accommodating space,
   wherein, when an electrical signal is supplied to the coil, the coil and the movable body are caused to move relatively in the axial direction, thereby vibrating the diaphragm to generate sound, and the vibration of the movable body vibrates the housing,
   wherein the movable body is provided with a weight increasing member that increases the weight of the movable body,
   wherein the movable body includes a magnet, and a yoke that is attached to the magnet, the movable body constituting a magnetic circuit that leads lines of magnetic force from the magnet to the coil,
   wherein a part that increases the weight of the yoke is formed in the yoke, and
   wherein the weight increasing member includes the part of the yoke.

2. The actuator according to claim 1, wherein the movable body includes a magnet, and the weight increasing member is provided in the magnet.

3. The actuator according to claim 1,
   wherein the movable body includes a magnet,
   wherein the weight increasing member is formed of a material having a greater specific gravity than the magnet, and
   wherein the weight increasing member is mounted to the magnet.

4. The actuator according to claim 1,
   wherein the movable body includes a magnet, and a yoke that is attached to the magnet, the movable body constituting a magnetic circuit that leads lines of magnetic force from the magnet to the coil, and
   wherein the weight increasing member is provided in the yoke.

5. The actuator according to claim 4, wherein the yoke, the housing, and the spring are integrally formed.

6. The actuator according to claim 4, wherein the yoke, the housing, the spring, and the weight increasing member are formed by pressing, where pressing includes bending, drawing, or punching.

7. The actuator according to claim 1, wherein the yoke, and the part that increases the weight of the yoke are formed by pressing, where pressing includes bending, drawing, or punching.

8. The actuator according to claim 1,
   wherein the movable body includes a magnet,
   wherein the magnet is configured such that a portion of the magnet in a thickness direction thereof is located radially inside the coil, and the remaining portion is located on an extension of the space, and bulged parts are formed in the remaining portion of the magnet so as to bulge in a direction parallel to the radial outward direction of the coil, and
   wherein the bulged parts constitutes the weight increasing member.

9. The actuator according to claim 1,
   wherein the movable body includes a magnet, and a yoke that constitute a magnetic circuit that leads lines of magnetic force from the magnetic to the coil,
   wherein the yoke includes a circular bottom wall, and a tubular side wall that is erected from a periphery of the bottom wall, and
   wherein the magnet is attached to a middle of the bottom wall and is located inside the tubular side wall, and
   wherein an end of the coil positioned away from the diaphragm is located outside the magnet and inside the tubular side wall.

10. The actuator according to claim 1, wherein the housing is formed in the shape of a tube, an axial end of the housing is attached to an outer edge of the diaphragm, and a cover that closes the accommodating space is attached to the other axial end of the housing.

11. An actuator comprising:
    a diaphragm that vibrates to generate sound;
    a housing that is attached to an outer edge of the diaphragm to support the diaphragm;

an accommodating space that is formed inside the diaphragm and the housing, and an axis of which extends in a thickness direction of the diaphragm in the middle of the diaphragm;

a coil that is wound around the axis, is attached to a face of the diaphragm facing the accommodating space, and is disposed in the accommodating space;

a movable body that is disposed in a radial inside space of the coil or on an extension of the radial inside space, within the accommodating space; and a spring that supports the movable body such that the movable body is movable in the axial direction within the accommodating space, wherein, when an electrical signal is supplied to the coil, the coil and the movable body are caused to move relatively in the axial direction, thereby vibrating the diaphragm to generate sound, and the vibration of the movable body vibrates the housing, wherein the movable body is provided with a weight increasing member that increases the weight of the movable body, wherein an electrical signal to be supplied to the coil is an alternating current, and wherein, when the electrical signal for one period is counted as one time, the number of times the electrical signals are to be supplied to the coil for vibrating the housing ranges from two to five.

12. A touch panel display device comprising: a panel unit having a display panel and a touch panel disposed on the display panel, a driving circuit that sends out an electrical signal when the touch panel is touched by a user, and an actuator that vibrates the panel unit on the basis of the electrical signal of the driving circuit, the actuator including:

a diaphragm that vibrates to generate sound;

a housing that is attached to an outer edge of the diaphragm to support the diaphragm;

an accommodating space that is formed inside the diaphragm and the housing, and an axis of which extends in a thickness direction of the diaphragm in the middle of the diaphragm;

a coil that is wound around the axis, is attached to a face of the diaphragm facing the accommodating space, and is disposed in the accommodating space;

a movable body that is disposed in a radial inside space of the coil or on an extension of the radial inside space, within the accommodating space; and a spring that supports the movable body such that the movable body is movable in the axial direction within the accommodating space, wherein, when an electrical signal is supplied to the coil, the coil and the movable body are caused to move relatively in the axial direction, thereby vibrating the diaphragm to generate sound, and the vibration of the movable body vibrates the housing, wherein the movable body is provided with a weight increasing member that increases the weight of the movable body, a chassis, wherein a plate-shaped frame is disposed inside the chassis, the panel unit is sandwiched by a frame-like front face of the chassis and one face of the frame in a thickness direction thereof such that the touch panel faces the frame-like front face, and the actuator is attached to the other face of the frame in the thickness direction thereof and is disposed apart from the panel unit.

13. The touch panel display device according to claim 12, wherein the housing is formed in the shape of a tube, an end of the housing opposite to an end thereof to which the diaphragm is attached in the axial direction of the housing is attached to a rear surface of the panel unit that is located opposite to the touch panel, whereby the actuator is disposed.

14. An electronic apparatus comprising: a panel unit having a display panel and a touch panel disposed on the display panel, a driving circuit that sends out an electrical signal when the touch panel is touched by a user, and an actuator that vibrates the panel unit on the basis of the electrical signal of the driving circuit, the actuator including:

a diaphragm that vibrates to generate sound;

a housing that is attached to an outer edge of the diaphragm to support the diaphragm;

an accommodating space that is formed inside the diaphragm and the housing, and an axis of which extends in a thickness direction of the diaphragm in the middle of the diaphragm;

a coil that is wound around the axis, is attached to a face of the diaphragm facing the accommodating space, and is disposed in the accommodating space;

a movable body that is disposed in a radial inside space of the coil or on an extension of the radial inside space, within the accommodating space; and a spring that supports the movable body such that the movable body is movable in the axial direction within the accommodating space, wherein, when an electrical signal is supplied to the coil, the coil and the movable body are caused to relatively move in the axial direction, thereby vibrating the diaphragm to generate sound, and the vibration of the movable body vibrate the housing, wherein the movable body is provided with a weight increasing member that increases the weight of the movable body; and a chassis, wherein a plate-shaped frame is disposed inside the chassis, the panel unit is sandwiched by a frame-like front face of the chassis and one face of the frame in a thickness direction thereof such that the touch panel faces the frame-like front face, and the actuator is attached to the other face of the frame in the thickness direction thereof and is disposed apart from the panel unit.

* * * * *